United States Patent
Yang et al.

(10) Patent No.: US 9,756,620 B2
(45) Date of Patent: *Sep. 5, 2017

(54) METHOD AND DEVICE FOR TRANSMITTING CONTROL INFORMATION

(71) Applicant: LG ELECTRONICS INC., Seoul (KR)

(72) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,022

(22) Filed: Jun. 19, 2015

(65) Prior Publication Data

US 2015/0289259 A1    Oct. 8, 2015

Related U.S. Application Data

(63) Continuation of application No. 13/809,826, filed as application No. PCT/KR2011/005496 on Jul. 26, 2011, now Pat. No. 9,084,243.

(Continued)

(51) Int. Cl.
*H04W 4/00* (2009.01)
*H04W 72/04* (2009.01)
(Continued)

(52) U.S. Cl.
CPC ....... *H04W 72/0413* (2013.01); *H04L 1/0027* (2013.01); *H04L 1/1671* (2013.01);
(Continued)

(58) Field of Classification Search
CPC ................ H04L 5/0055; H04W 72/04; H04W 72/1278; H04W 28/26
(Continued)

(56) References Cited

U.S. PATENT DOCUMENTS 9,084,243 B2 * 7/2015 Yang ..................... H04L 1/0027
2009/0219897 A1 * 9/2009 Pajukoski ............. H04L 1/1671
370/336

(Continued)

FOREIGN PATENT DOCUMENTS

WO    WO 2011/041623 A1    4/2011

OTHER PUBLICATIONS

ETSI; "LTE; Evolved Universal Terrestrial Radio Access (E-UTRA); Physical layer procedures (3GPP TS 36.213 version 8.8.0 Release 8)"; Oct. 2009; 79 pages.

(Continued)

*Primary Examiner* — Marsha D. Banks Harold
*Assistant Examiner* — Elton Williams
(74) *Attorney, Agent, or Firm* — Birch, Stewart, Kolasch & Birch, LLP

(57) ABSTRACT

A method for transmitting uplink control information by a communication apparatus configured with a plurality of cells including a Primary Cell (PCell) and a Secondary Cell (SCell) in a wireless communication system. Only one Physical Downlink Shared Channel (PDSCH) is received on the PCell among the plurality of cells in a first subframe. Hybrid Automatic Repeat Request Acknowledgement (HARQ-ACK) information about the PDSCH is transmitted through a Physical Uplink Control Channel (PUCCH) in a second subframe configured for Scheduling Request (SR) transmission. For a positive SR in the second subframe, the HARQ-ACK information is transmitted using a SR PUCCH resource. For a negative SR in the second subframe, the HARQ-ACK information is transmitted using a HARQ-ACK PUCCH resource different from the SR PUCCH resource.

12 Claims, 19 Drawing Sheets

Related U.S. Application Data

(60) Provisional application No. 61/367,858, filed on Jul. 26, 2010.

(51) Int. Cl.
   *H04L 1/00* (2006.01)
   *H04L 1/16* (2006.01)
   *H04L 5/00* (2006.01)
   *H04L 1/18* (2006.01)

(52) U.S. Cl.
   CPC .............. *H04L 1/1887* (2013.01); *H04L 5/00* (2013.01); *H04L 5/0032* (2013.01); *H04L 5/0053* (2013.01); *H04L 5/0055* (2013.01); *H04W 72/042* (2013.01); *H04W 72/0406* (2013.01); *H04L 1/0026* (2013.01); *H04L 1/0028* (2013.01); *H04L 1/0068* (2013.01); *H04L 1/0072* (2013.01); *H04L 5/001* (2013.01)

(58) Field of Classification Search
   USPC .......... 370/336, 326, 498; 455/509; 709/226
   See application file for complete search history.

(56) References Cited

U.S. PATENT DOCUMENTS

| | | | |
|---|---|---|---|
| 2010/0195629 A1* | 8/2010 | Chen ..................... | H04L 1/1664 370/336 |
| 2011/0134774 A1* | 6/2011 | Pelletier .............. | H04W 52/365 370/252 |
| 2011/0205981 A1* | 8/2011 | Koo ...................... | H04L 1/1671 370/329 |
| 2011/0243066 A1* | 10/2011 | Nayeb Nazar .......... | H04L 1/007 370/328 |

OTHER PUBLICATIONS

3rd Generation Partnership Project, "Technical Specification Group Radio Access Network; Evolved Universal Terrestrial Radio Access (E-UTRA); Physical Layer Procedures (Release 8)," 3GPP TS 36.213, V8.8.0, Sep. 1, 2009, pp. 1-81, XP050377563A.

* cited by examiner

METHOD AND DEVICE FOR TRANSMITTING CONTROL INFORMATION

CROSS-REFERENCE TO RELATED APPLICATIONS

This application is a continuation of co-pending U.S. patent application Ser. No. 13/809,826 filed on Jan. 11, 2013 (now U.S. Pat. No. 9,084,243 issued on Jul. 14, 2015), which is the National Phase of PCT/KR2011/005496 filed on Jul. 26, 2011, which claims priority under 35 U.S.C. §119(e) to U.S. Provisional Application No. 61/367,858 filed Jul. 26, 2010, all which are hereby expressly incorporated by reference into the present application.

BACKGROUND OF THE INVENTION

Technical Field

The present invention relates to a wireless communication system, and more particularly, to a method and apparatus for transmitting control information.

Background Art

Wireless communication systems are being widely deployed to provide various types of communication services such as voice or data services. Generally, a wireless communication system is a multiple access system capable of supporting communication with multiple users by sharing available system resources (bandwidth, transmit power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

SUMMARY OF THE INVENTION

An object of the present invention is to provide a method and apparatus for efficiently transmitting control information in a wireless communication system. Another object of the present invention is to provide a method and apparatus for efficiently transmitting uplink control information in a situation in which a plurality of cells is configured and efficiently managing resources for transmission of the uplink control information. It will be appreciated by persons skilled in the art that that the technical objects that can be achieved through the present invention are not limited to what has been particularly described hereinabove and other technical objects of the present invention will be more clearly understood from the following detailed description.

In an aspect of the present invention, a method for transmitting uplink control information in a situation in which a plurality of cells including a Primary Cell (PCell) and a Secondary Cell (SCell) is configured in a wireless communication system includes receiving one or more Physical Downlink Control Channels (PDCCHs); generating reception response information corresponding to the one or more PDCCHs; and transmitting the reception response information on a subframe through a Physical Uplink Control Channel (PUCCH), wherein, if only one PCell PDCCH is detected and a prescribed condition is satisfied, the reception response information is transmitted using a PUCCH resource pre-configured by a higher-layer signaling, and if only one PCell PDCCH is detected and a prescribed condition is not satisfied, the reception response information is transmitted using a PUCCH resource linked with an index of a resource constituting the PCell PDCCH.

In another aspect of the present invention, a communication apparatus configured to transmit uplink control information in a situation in which a plurality of cells including a Primary Cell (PCell) and a Secondary Cell (SCell) is configured in a wireless communication system includes a Radio Frequency (RF) unit; and a processor, wherein the processor is configured to receive one or more Physical Downlink Control Channels (PDCCHs), generate reception response information corresponding to the one or more PDCCHs, and transmit the reception response information on a subframe through a Physical Uplink Control Channel (PUCCH), and wherein, if only one PCell PDCCH is detected and a prescribed condition is satisfied, the reception response information is transmitted using a PUCCH resource pre-configured by a higher-layer signaling, and if only one PCell PDCCH is detected and a prescribed condition is not satisfied, the reception response information is transmitted using a PUCCH resource linked with an index of a resource constituting the PCell PDCCH.

The prescribed condition may be that the subframe is a Scheduling Request (RS) subframe.

The prescribed condition may be that the subframe is a Scheduling Request (RS) subframe and a positive SR is triggered.

If one or more SCell PDCCHs are detected, the method may further include transmitting the reception response information using a PUCCH resource indicated by the one or more SCell PDCCHs.

The reception response information may be transmitted using a PUCCH resource indicated by a value of a Transmit Power Control (TPC) field of the one or more SCell PDCCHs.

The PUCCH resource linked with an index of a resource constituting the PCell PDCCH may be provided using the smallest Control Channel Element (CCE) index constituting the PCell PDCCH.

If the subframe is a Scheduling Request (SR) subframe, one-bit information indicating a positive/negative SR may be joint-coded with the reception response information.

According to embodiments of the present invention, control information can be efficiently transmitted in a wireless communication system. Specifically, control information can be efficiently transmitted in a situation in which a plurality of cells is configured and resources for transmission of the uplink control information can be efficiently managed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

The following technology may be used in various wireless access systems, such as CDMA, FDMA, TDMA, OFDMA and SC-FDMA systems. CDMA may be implemented with wireless technology such as Universal Terrestrial Radio Access (UTRA) or CDMA2000. TDMA may be implemented with wireless technology such as Global System for Mobile communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802.20, and Evolved UTRA (E-UTRA). UTRA is part of a Universal Mobile Telecommunications System (UMTS). 3rd Generation Partnership Project (3GPP) Long Term Evolution (LTE) is a part of an Evolved UMTS (E-UMTS), which uses E-UTRA. LTE-Advanced (LTE-A) is an evolved version of 3GPP LTE.

The following embodiments of the present invention mainly describe 3GPP LTE/LTE-A in order to clarify the description. However, technical spirits of the present invention are not limited to the embodiments of the present invention described herein. Specific terms disclosed in the following description are provided to aid in understanding the present invention, and the use of these specific terms may be changed to another format within the technical scope or spirit of the present invention.

Figure 1:
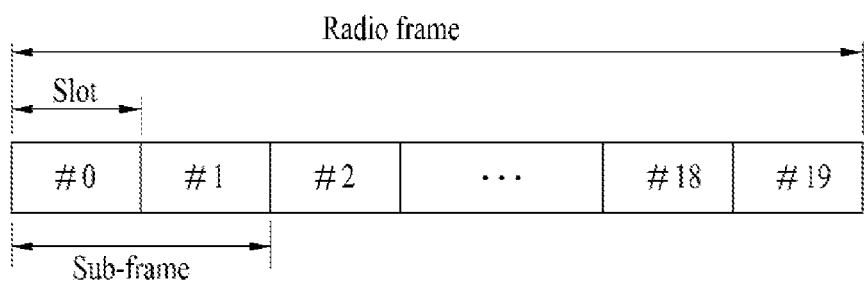
FIG. 1 illustrates the structure of a radio frame.

FIG. 1 illustrates the structure of a radio frame.

Referring to FIG. 1, the radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot may include a plurality of OFDM symbols or Single Carrier Frequency Division Multiple Access (SC-FDMA) symbols in the time domain. Since an LTE system uses OFDMA in downlink (DL) and SC-FDMA in uplink (UL), the OFDM or SC-FDMA symbol indicates one symbol duration. A Resource Block (RB) is a resource allocation unit and includes a plurality of contiguous subcarriers in one slot. The structure of the radio frame is only exemplary. The number of subframes included in a radio frame, the number of slots included in a subframe, or the number of symbols included in a slot may be changed in various manners.

Figure 2:
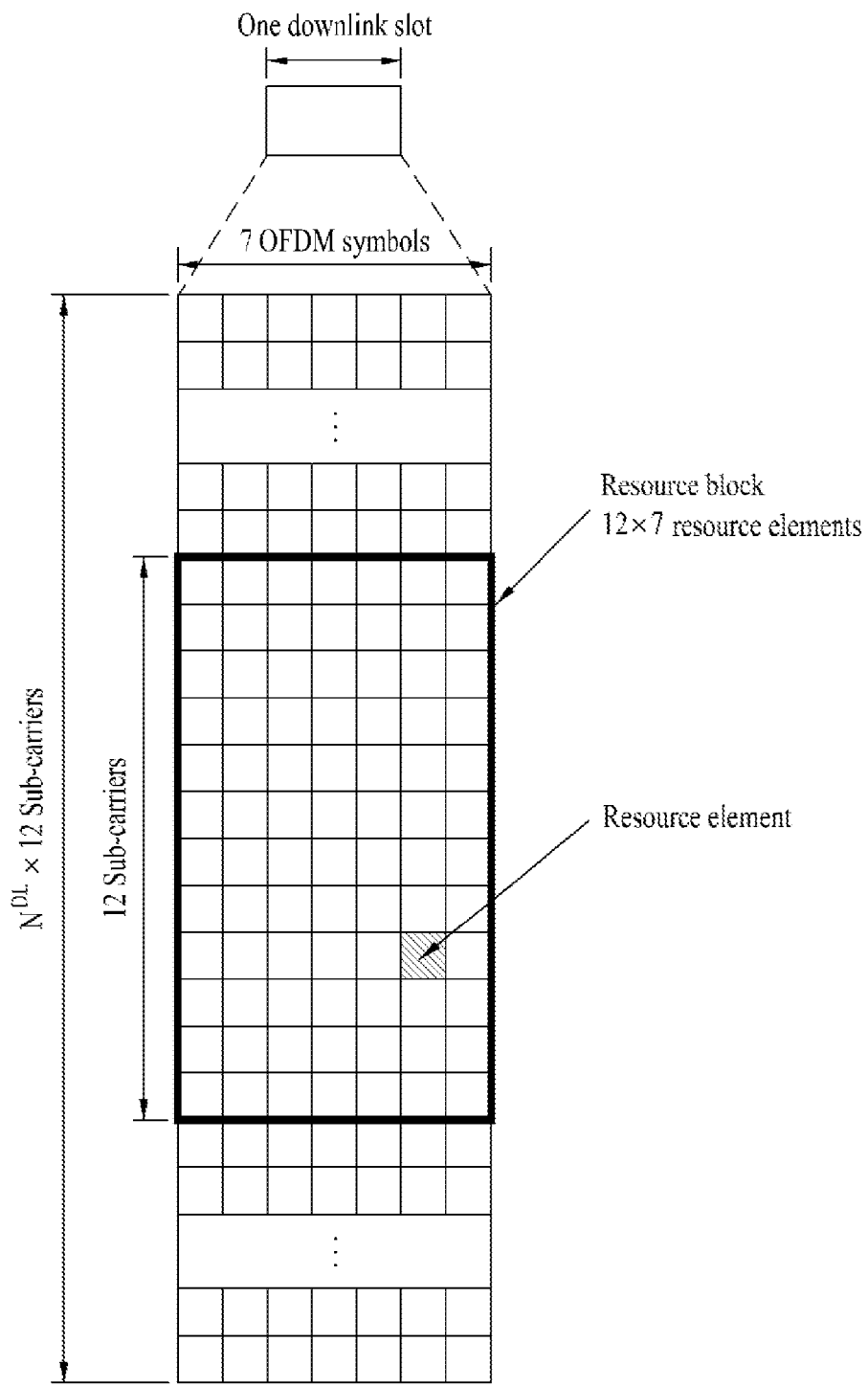
FIG. 2 illustrates a resource grid of a downlink slot.

FIG. 2 illustrates a resource grid of a DL slot.

Referring to FIG. 2, the DL slot includes a plurality of OFDM symbols in the time domain. One DL slot includes 7 (or 6) OFDM symbols and an RB may include 12 subcarriers in the frequency domain. Each element on the resource grid is referred to as a Resource Element (RE). One RB includes 12×7 (or 6) REs. The number of RBs, NRB, included in the DL slot depends on a DL transmission band. The structure of a UL slot is the same as the structure of the DL slot except that OFDM symbols are replaced with SC-FDMA symbols.

Figure 3:
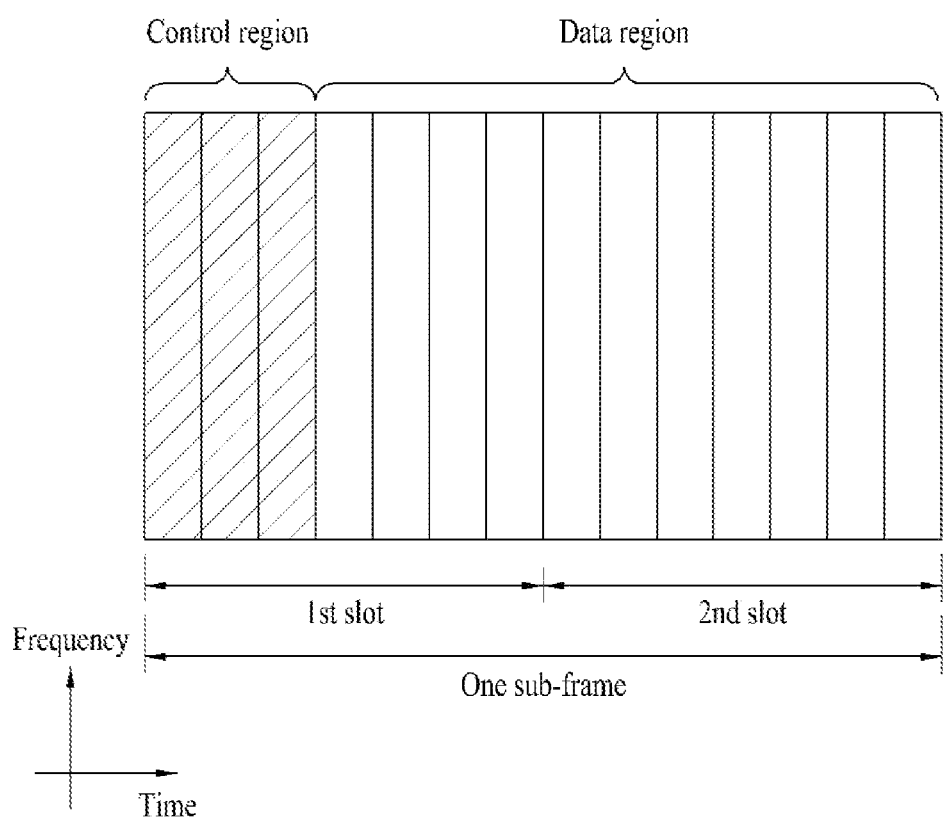
FIG. 3 illustrates the structure of a downlink subframe.

FIG. 3 illustrates the structure of a DL subframe.

Referring to FIG. 3, a maximum of 3 (or 4) OFDM symbols at the front part of a first slot of a subframe corresponds to a control region to which control channels are allocated. The remaining OFDM symbols correspond to a data region to which a Physical Downlink Shared Channel (PDSCH) is allocated. Examples of DL control channels used in the LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted in the first OFDM symbol of a subframe and carries information about the number of OFDM symbols used for transmission of control channels in the subframe. The PHICH carries a Hybrid Automatic Repeat request (HARQ) Acknowledgment/Negative-Acknowledgment (ACK/NACK) signal as a response to UL transmission.

Control information transmitted through the PDCCH is referred to as Downlink Control Information (DCI). The DCI includes resource allocation information for a User Equipment (UE) or a UE group and other control information. For example, the DCI includes UL/DL scheduling information, a UL transmit (Tx) power control command, etc.

The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCH is transmitted on an aggregate of one or plural contiguous Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of bits of the PDCCH are determined according to the number of CCEs. A Base Station (BS) determines a PDCCH format according to DCI to be transmitted to a UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI))

may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Figure 4:
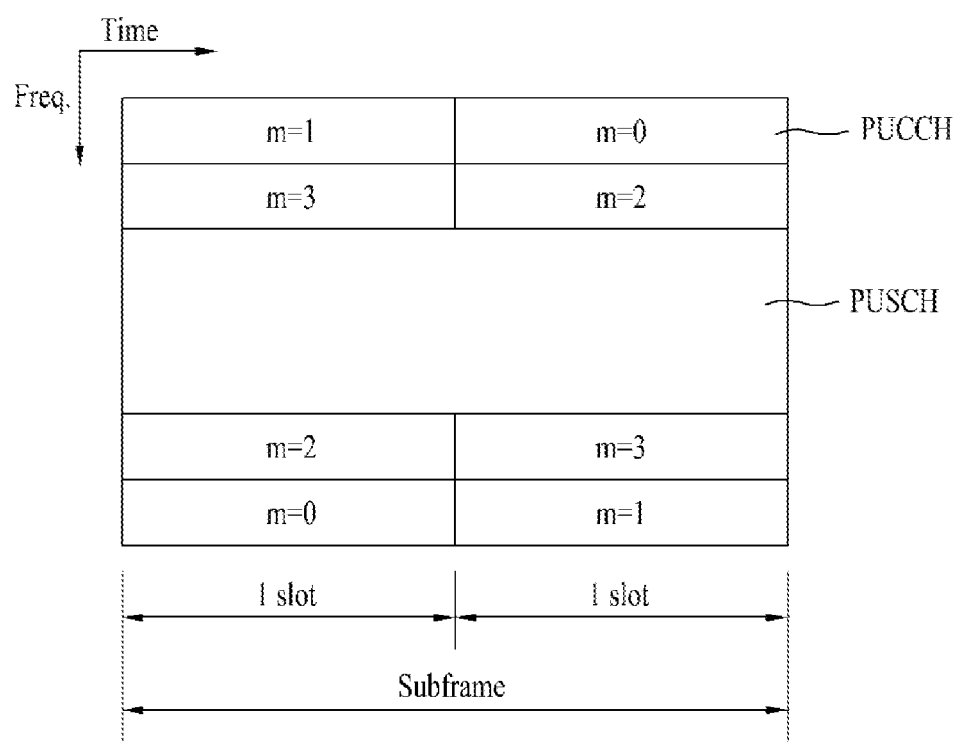
FIG. 4 illustrates the structure of an uplink subframe.

FIG. 4 illustrates the structure of a UL subframe used in an LTE system.

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a PUSCH and is used to transmit data signals such as voice signals. The control region includes a PUCCH and is used to transmit Uplink Control Information (UCI). The PUCCH includes an RB pair located at both ends of the data region in the frequency domain and is hopped using the slot as a boundary.

The PUCCH may be used to transmit the following control information.

Scheduling Request (SR): used for requesting UL-SCH resources and transmitted using an On-Off Keying (OOK) scheme.

HARQ ACK/NACK: a response signal to a DL data packet on a PDSCH and indicates whether or not a DL data packet has been successfully received. 1-bit ACK/NACK is transmitted as a response to a single DL codeword, and 2-bit ACK/NACK is transmitted as a response to two DL codewords.

Channel Quality Indicator (CQI): feedback information for a DL channel. Multiple Input Multiple Output (MIMO)-associated feedback information includes a Rank Indicator (RI), a Precoding Matrix Indicator (PMI), a Precoding Type Indicator (PTI), etc. 20 bits are used per subframe.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmission information.

Table 1 shows the mapping relationship between PUCCH and UCI for use in LTE.

TABLE 1

| PUCCH Format | Uplink Control Information (UCI) |
| --- | --- |
| Format 1 | SR(Scheduling Request) (unmodulated waveform) |
| Format 1a | 1-bit HARQ ACK/NACK (with/without SR) |
| Format 1b | 2-bit HARQ ACK/NACK (with/without SR) |
| Format 2 | CQI (20 coded bits) |
| Format 2 | CQI and 1- or 2-bit HARQ ACK/NACK (20 bits) (for extended CP only) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
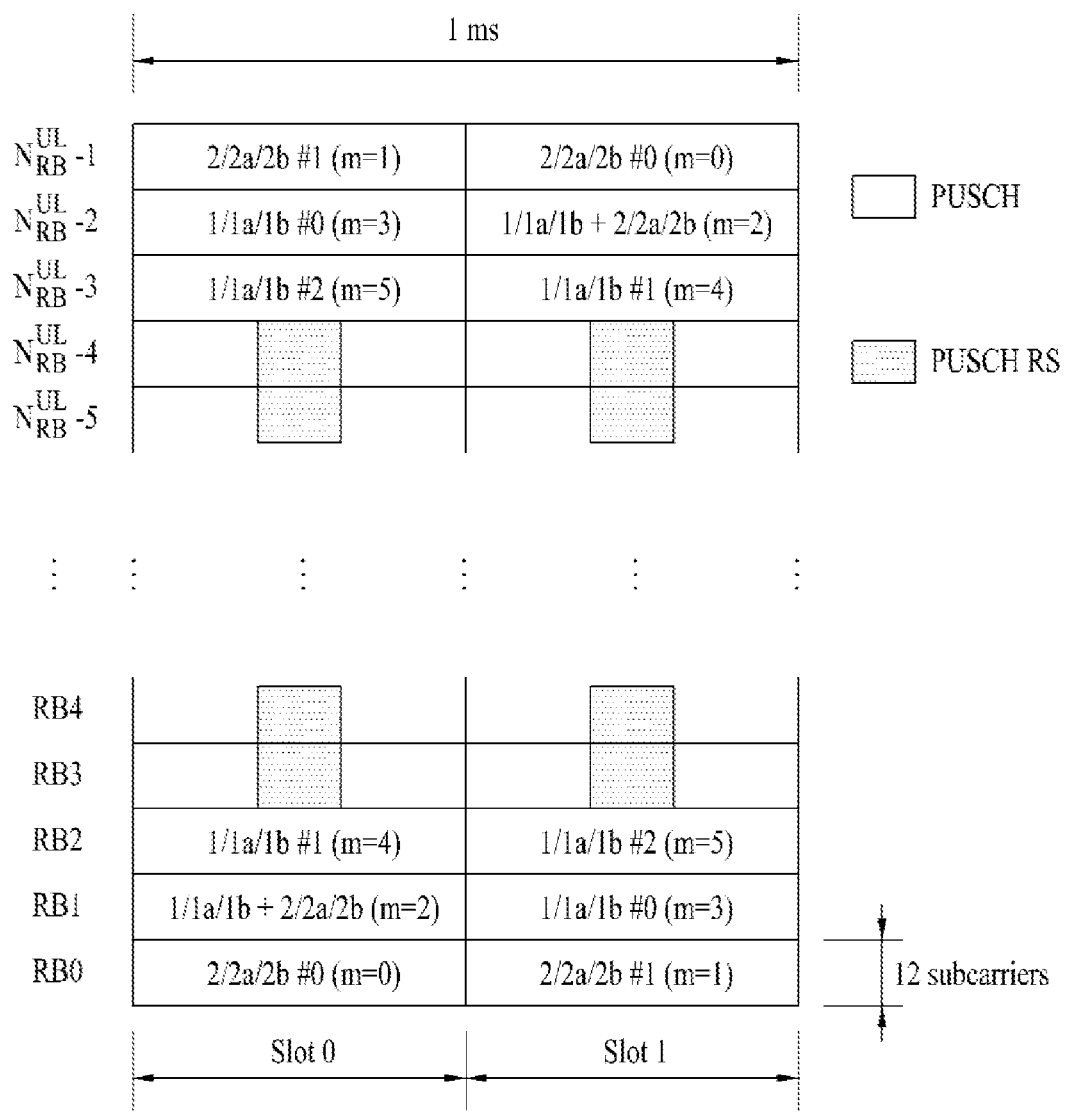
FIG. 5 illustrates physical mapping of PUCCH formats to PUCCH regions.

FIG. 5 illustrates physical mapping of PUCCH formats to PUCCH regions.

Referring to FIG. 5, PUCCH formats are mapped beginning from band edges on RBs in order of PUCCH format 2/2a/2b (CQI) (e.g. PUCCH region m=0, 1), a mixed format of PUCCH format 2/2a/2b (CQI) and PUCCH format 1/1a/1b (SR/HARQ ACK/NACK) (e.g. if present, PUCCH region m=2), and PUCCH format 1/1a/1b (SR/HARQ ACK/NACK) (e.g. PUCCH region m=3, 4, 5) and then are transmitted. The number of PUCCH RBs available for use by PUCCH format 2/2a/2b (CQI), $N_{RB}^{(2)}$, is transmitted to the UEs in the cell through broadcast signaling.

Figure 6:
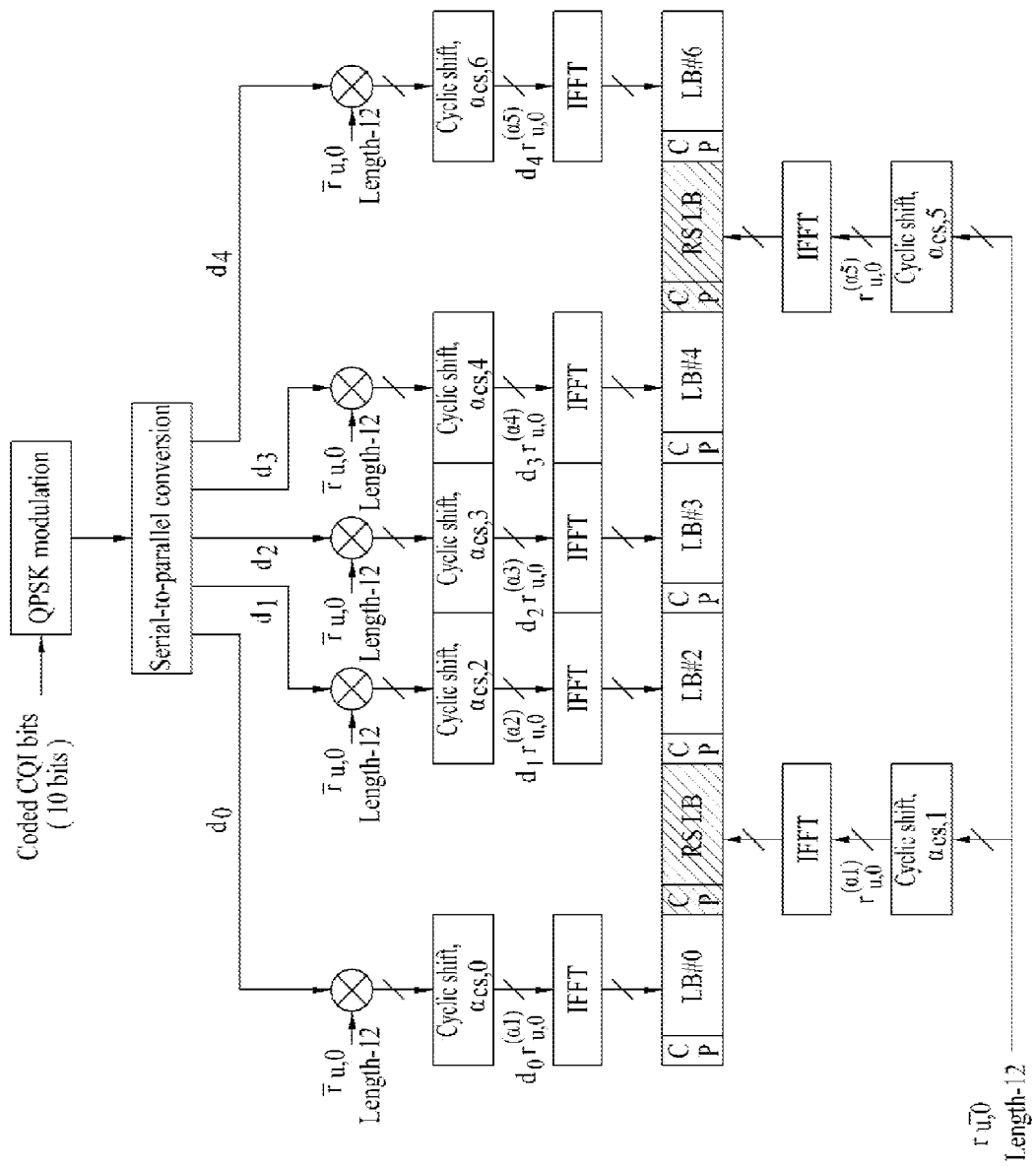
FIG. 6 illustrates a slot level structure of PUCCH format 2/2a/2b.

FIG. 6 illustrates a slot level structure of PUCCH format 2/2a/2b. The PUCCH format 2/2a/2b is used for Channel State Information (CSI) transmission. The CSI includes CQI, PMI, RI, PTI, etc. SC-FDMA symbols #1 and #5 are used for Demodulation Reference Signal (DM RS) transmission in a slot in the case of normal CP. In the case of extended CP, only SC-FDMA symbol #3 is used for DM RS transmission in the slot.

Referring to FIG. 6, 10 CSI bits are channel coded with a rate ½ punctured (20, k) Reed-Muller code in a subframe level to give 20 coded bits (not shown), which are then scrambled (not shown) and undergo Quadrature Phase Shift Keying (QPSK) constellation mapping (QPSK modulation). The coded bits may be scrambled in a similar way to PUSCH data with a length-31 Gold sequence. 10 QPSK modulated symbols are generated and 5 QPSK modulated symbols d0 to d4 are transmitted in each slot through corresponding SC-FDMA symbols. Each QPSK modulated symbol is used to modulate a base RS sequence (ru, 0) of length-12 prior to Inverse Fast Fourier Transform (IFFT). Consequently, the RS sequences are cyclically shifted (dx*ru,O(αx), x=0 to 4) according to QPSK modulated symbol values in the time domain. The RS sequences multiplied by the QPSK modulated symbol values are cyclically shifted (αcs,x, x=1, 5). When the number of Cyclic Shifts (CSs) is N, N UEs can be multiplexed on the same CSI PUCCH RB. The DM RS sequence is similar to a CSI sequence in the frequency domain but is not modulated by a CSI modulation symbol.

Parameters/resources for periodic CSI reporting are semi-statically configured by higher layer signaling. For example, if PUCCH resource index $n_{PUCCH}^{(2)}$ is set for CSI transmission, the CSI is periodically transmitted on the CSI PUCCH linked to the PUCCH resource index $n_{PUCCH}^{(2)}$. The PUCCH resource index $n_{PUCCH}^{(2)}$ indicates a PUCCH RB and a CS αcs.

Figure 7:
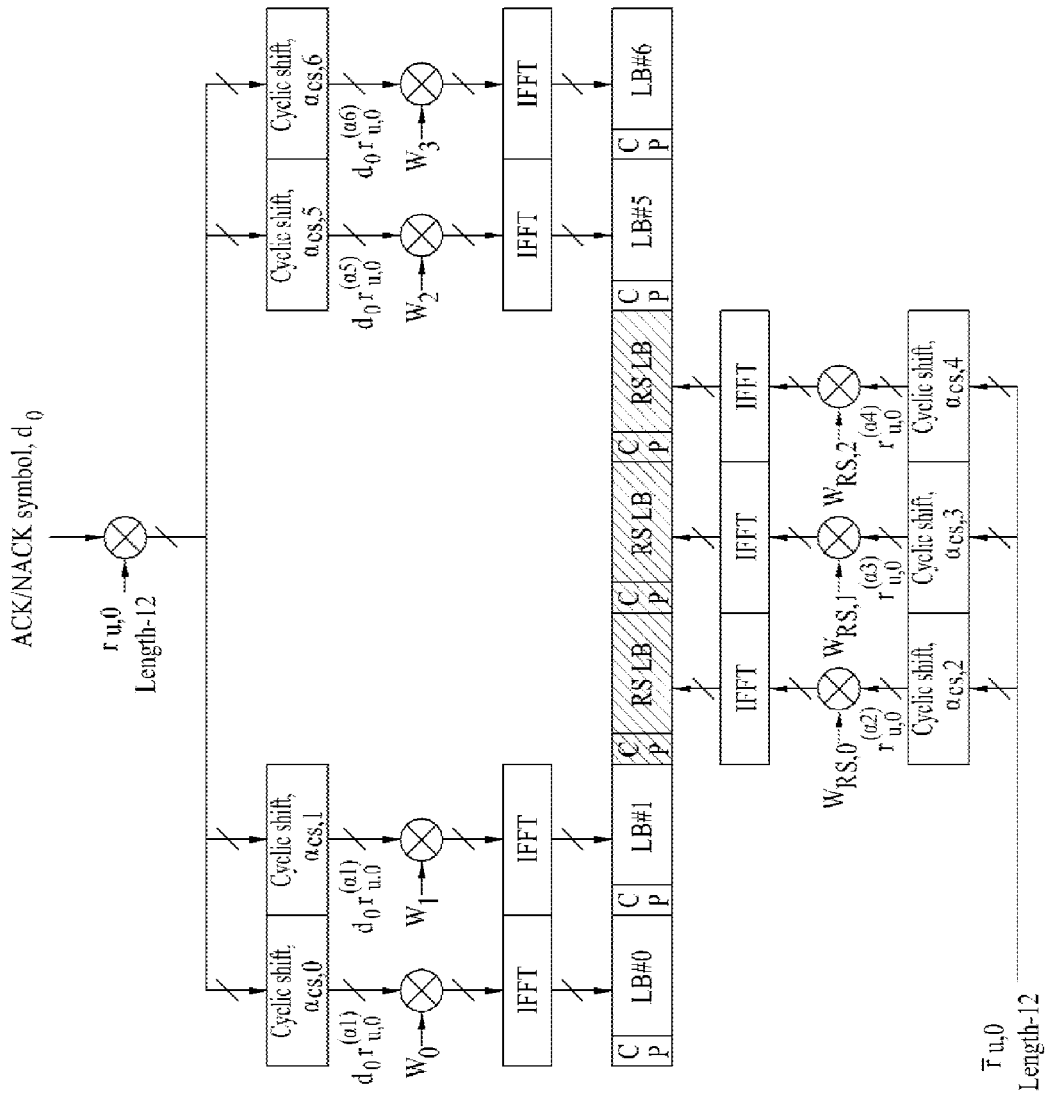
FIG. 7 illustrates a slot level structure of PUCCH format 1a/1b.

FIG. 7 illustrates a slot level structure of PUCCH format 1a/1b. The PUCCH format 1a/1b is used for ACK/NACK transmission. SC-FDMA symbols #2/#3/#4 are used for DM RS transmission in the case of normal CP. In the case of extended CP, SC-FDMA symbols #2/#3 are used for DM RS transmission. Accordingly, four SC-FDMA symbols are used for ACK/NACK transmission in one slot.

Referring to FIG. 7, 1-bit ACK/NACK information and 2-bit ACK/NACK information are modulated using BPSK and QPSK modulation schemes, respectively, resulting in a single ACK/NACK modulation symbol d0. ACK/NACK information is given as 1 for a positive ACK and as 0 for a negative ACK (NACK). Table 2 shows a modulation table defined for PUCCH formats 1a and 1b in legacy LTE.

TABLE 2

| PUCCH format | $b(0), \ldots, b(M_{bit} - 1)$ | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

In addition to the CS αcs,x in the frequency domain as in the CQI case above, the PUCCH format 1a/1b perform time domain spreading using orthogonal spreading codes (e.g. Walsh-Hadamard or DFT codes) w0, w1, w2, and w3. Since code multiplexing is used in both the frequency and time domains in the case of PUCCH format 1a/1b, a large number of UEs can be multiplexed on the same PUCCH RB.

RSs transmitted from different UEs are multiplexed in the same way as UCI. The number of CSs supported in an SC-FDMA symbol for PUCCH ACK/NACK RBs may be configured by a cell-specific higher-layer signaling parameter $\Delta_{shift}^{PUCCH}$. $\Delta_{shift}^{PUCCH} \in \{1, 2, 3\}$ indicates 12, 6, and 4 shifts, respectively. In time-domain CDM, the number of spreading codes for ACK/NACK is limited by the number of RS symbols, because the multiplexing capacity of RS symbols is smaller than that of UCI symbols due to a smaller number of RS symbols.

Figure 8:
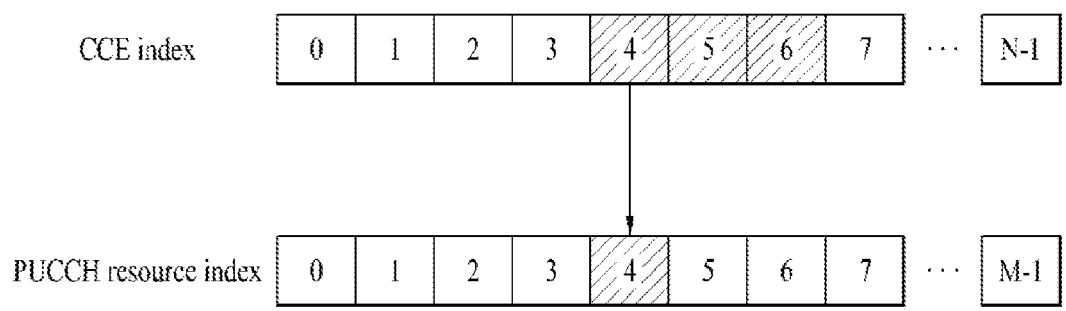
FIG. 8 illustrates determination of PUCCH resources for ACK/NACK.

FIG. 8 illustrates determination of PUCCH resources for ACK/NACK. In an LTE system, a PUCCH resource for ACK/NACK is not pre-allocated to each UE and a plurality of UEs separately uses a plurality of PUCCH resources at each time point. Specifically, a PUCCH resource used by a UE to transmit ACK/NACK corresponds to a PUCCH on which scheduling information for corresponding DL data is carried. An entire region in which a PDCCH is transmitted in each DL subframe includes a plurality of CCEs and a PDCCH transmitted to the UE is comprised of one or more CCEs. The UE transmits ACK/NACK through a PUCCH resource corresponding to a specific CCE (e.g. first CCE) among CCEs constituting a PDCCH received thereby.

Referring to FIG. 8, in a DL Component Carrier (CC), each rectangle indicates a CCE and, in a UL CC, each rectangle indicates a PUCCH resource. Each PUCCH index corresponds to a PUCCH resource for ACK/NACK. As shown in FIG. 8, assuming that information for a PDSCH is transmitted through a PDCCH consisting of CCEs of indexes 4 to 6, the UE transmits ACK/NACK through a PUCCH of index 4 corresponding to the CCE of index 4 which is the first CCE of the CCEs constituting the PDCCH. FIG. 8 shows the case in which a maximum of M PUCCHs is present in a UL CC when a maximum of N CCEs is present in a DL CC. Although N may equal to M, it is possible to design different M and N values and to overlap mapping of CCEs and PUCCHs.

Specifically, a PUCCH resource index in the LTE system is determined as follows.

$$n^{(1)}_{PUCCH} = n_{CCE} + N^{(1)}_{PUCCH} \quad \text{[Equation 1]}$$

where $n^{(1)}_{PUCCH}$ denotes a resource index of PUCCH format 1 for transmitting ACK/NACK/Discontinuous Transmission (DTX), $N^{(1)}_{PUCCH}$ denotes a signaling value transmitted from a higher layer, and $n_{CCE}$ denotes the smallest value among CCE indexes used for PDCCH transmission. A CS, an orthogonal spreading code, and a Physical Resource Block (PRB), for PUCCH format 1a/1b, are obtained from $n^{(1)}_{PUCCH}$.

When the LTE system operates in TDD mode, the UE transmits one multiplexed ACK/NACK signal with respect to a plurality of PDSCHs received through different subframes. In more detail, the UE transmits one multiplexed ACK/NACK signal with respect to a plurality of PDSCHs using an ACK/NACK selection scheme. The ACK/NACK selection scheme is also called a PUCCH selection scheme. In the ACK/NACK selection scheme, the UE occupies a plurality of UL physical channels in order to transmit the multiplexed ACK/NACK signal upon receiving multiple DL data. For example, upon receiving a plurality of PDSCHs, the UE may occupy the same number of PUCCHs using a specific CCE of PDCCHs indicating the respective PDSCHs. In this case, the multiplied ACK/NACK signal may be transmitted according to which PUCCH is selected from among the occupied plural PUCCHs and using a combination of modulation applied to the selected PUCCH and coded content.

Table 3 shows the ACK/NACK selection scheme defined in the LTE system.

TABLE 3

| HARQ-ACK(0), HARQ-ACK(1), HARQ-ACK(2), HARQ-ACK(3) | Subframe $n^{(1)}_{PUCCH,X}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) indicates the HARQ ACK/NACK/DTX for the i-th data unit (where 0≤i≤3). DTX means there is no data unit transmitted for corresponding HARQ-ACK(i) or the UE does not detect the existence of the data unit corresponding to HARQ-ACK(i). In association with each data unit, a maximum of 4 PUCCH resources (i.e. n(1)PUCCH,0~n(1)PUCCH,3) can be occupied. A multiplexed ACK/NACK is transmitted through one PUCCH resource selected from the occupied PUCCH resources. In Table 3, n(1)PUCCH,X indicates a PUCCH resource used for actual ACK/NACK transmission. b(0)b(1) indicates two bits transmitted through the selected PUCCH resource and is modulated using a QPSK scheme. For example, if the UE successfully decodes 4 data units, the UE transmits (1,1) through a PUCCH resource associated with n(1)PUCCH,1. NACK and DTX are coupled as NACK/DTX (N/D) except for some cases because combinations of PUCCH resources and QPSK symbols are insufficient to indicate all possible ACK/NACK hypotheses.

Figure 9:
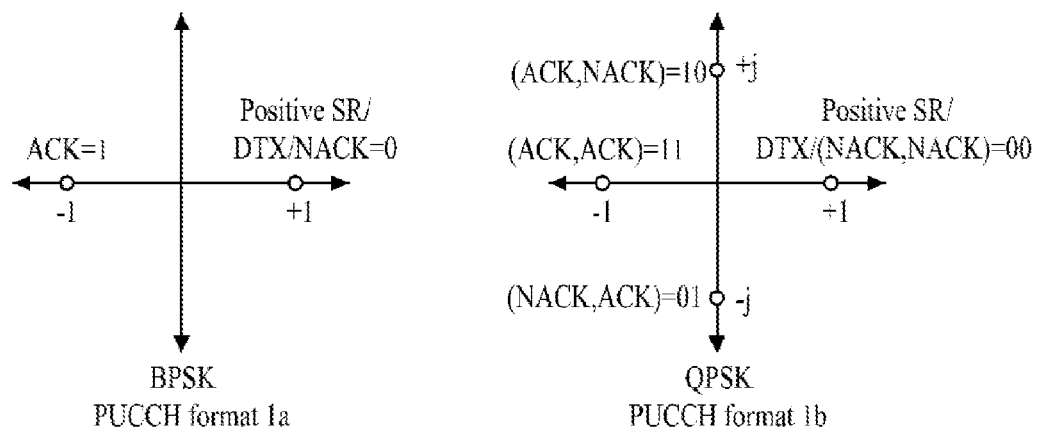
FIG. 9 illustrates multiplexing of ACK/NACK and SR.

FIG. 9 illustrates multiplexing of ACK/NACK and SR by a UE.

The structure of SR PUCCH format 1 is the same as that of ACK/NACK PUCCH format 1a/1b shown in FIG. 9. SR uses on-off keying. Specifically, the UE transmits SR having a modulation symbol) d(0)=1 to request a PUSCH resource (positive SR transmission) and transmits nothing when scheduling is not requested (negative SR). Since a PUCCH structure for ACK/NACK is reused for SR, different PUCCH resource indexes (different cyclic time shifts/orthogonal code combinations) in the same PUCCH region may be assigned for SR (format 1) or HARQ ACK/NACK (format 1a/1b). A PUCCH resource index $m_{PUCCH,SRI}^{(1)}$ to be used by the UE for SR transmission is configured by UE-specific higher-layer signaling.

If the UE needs to transmit a positive SR in a subframe in which CQI transmission is scheduled, CQI is dropped and only the SR is transmitted. Similarly, if the UE needs to simultaneously transmit SR and SRS, CQI is dropped and only the SR is transmitted. If SR and ACK/NACK are generated in the same subframe, the UE transmits ACK/NACK on an SR PUCCH resource assigned for the positive SR. In the case of a negative SR, the UE transmits ACK/NACK on an assigned ACK/NACK PUCCH resource. FIG. 9 illustrates constellation mapping for simultaneous transmission of ACK/NACK and SR. Specifically, FIG. 9 illustrates modulation mapping of NACK (or (NACK, NACK) in the case of two MIMO codewords) to +1. When DTX is generated, it is processed as NACK.

Figure 10:
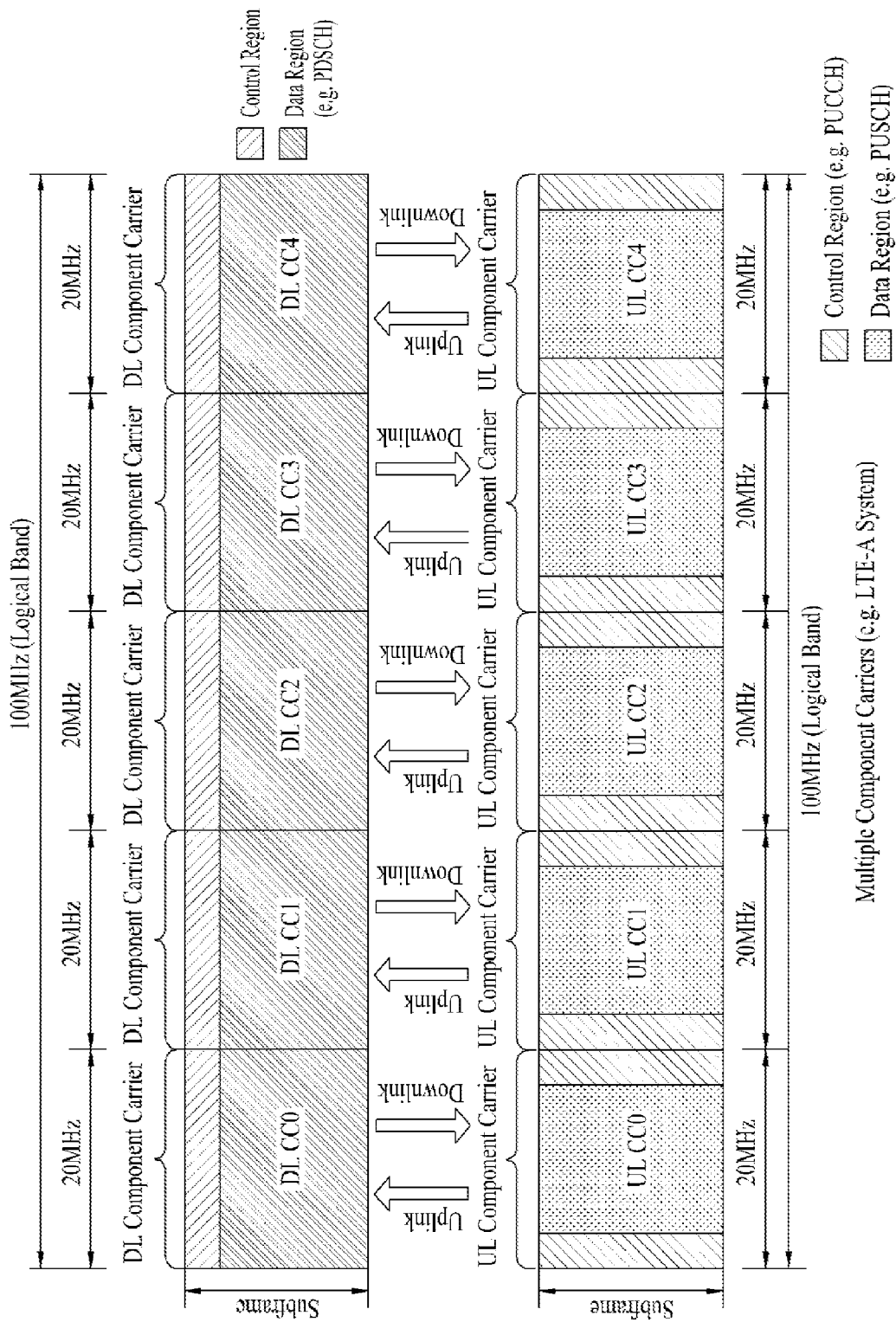
FIG. 10 illustrates a Carrier Aggregation (CA) communication system.

FIG. 10 illustrates a Carrier Aggregation (CA) communication system. An LTE-A system uses carrier aggregation or bandwidth aggregation that uses a wider UL/DL bandwidth by aggregating a plurality of UL/DL frequency blocks for a wider frequency band. Each frequency block is transmitted using a CC. The CC may be understood as a carrier frequency (or center carrier, center frequency) for the corresponding frequency block.

Referring to FIG. 10, a wider UL/DL bandwidth can be supported by aggregating a plurality of UL/DL CCs. CCs may be contiguous or noncontiguous in the frequency domain. The bandwidths of the CCs may be independently determined Asymmetric carrier aggregation in which the number of UL CCs differs from the number of DL CCs may be used. In the case of two DL CCs and one UL CC, for example, they may be configured such that the ratio of DL CCs to UL CCs is 2:1. The DL CC/UL CC link may be statically or semi-statically configured in a system. Furthermore, even if the entire system bandwidth is configured with N CCs, a frequency band that a specific UE can monitor/receive may be limited to M (<N) CCs. Various parameters regarding carrier aggregation may be configured cell-specifically, UE group-specifically, or UE-specifically. Meanwhile, control information may be configured so as to be transmitted and received only through a specific CC. This specific CC may be designated as a Primary CC (PCC) (or anchor CC) and the other CCs may be designated as Secondary CCs (SCCs).

LTE-A uses the concept of cells to manage radio resources. The cell is defined as a combination of DL and UL resources. Here, the UL resource is not an essential component. Accordingly, the cell can be configured with the DL resource alone, or with both the DL resource and UL resource. When carrier aggregation is supported, linkage between a DL resource carrier frequency (or DL CC) and a UL resource carrier frequency (or UL CC) may be indicated by system information. A cell that operates on the primary frequency (or PCC) may be designated as a primary cell (Pcell) and a cell that operates on the secondary frequency (or SCC) may be designated as a secondary cell (SCell). The PCell is used for the UE to perform an initial connection establishment or connection re-establishment procedure. PCell may represent a cell designated during a handover process. The SCell is configurable after RRC connection establishment and may be used to provide additional radio resources. The PCell and SCell may be commonly designated as a serving cell. Accordingly, for a UE that is in an RRC_CONNECTED state without carrier aggregation or does not support carrier aggregation, only one serving cell configured with only the PCell is present. Meanwhile, for a UE in an RRC_CONNECTED state, for which carrier aggregation is configured, one or more serving cells including the PCell and SCell are present. For carrier aggregation, a network may configure one or more SCells for a UE that supports carrier aggregation in addition to the PCell initially configured in the connection establishment procedure after an initial security activation procedure is initiated.

If cross-carrier scheduling (or cross-CC scheduling) is applied, a PDCCH for DL allocation may be transmitted through DL CC#0 and a corresponding PDSCH may be transmitted through DL CC#2. For cross-CC scheduling, introduction of a Carrier Indicator Field (CIF) may be considered. Presence or absence of the CIF within the PDCCH may be configured semi-statically and UE-specifically (or UE group-specifically) through higher-layer signaling (e.g., RRC signaling). The baseline of PDCCH transmission is summarized below.

CIF disabled: PDCCH on a DL CC assigns PDSCH resources on the same DL CC or PUSCH resources on a single linked UL CC.

CIF enabled: PDCCH on a DL CC can assign PDSCH or PUSCH resources on a specific DL/UL CC of multiple aggregated DL/UL CCs using the CIF.

When a CIF is present, a BS may allocate a DL CC set for monitoring a PDCCH in order to lower blind decoding complexity of a UE. The PDCCH monitoring DL CC set may be a part of all aggregated DL CCs and include one or more DL CCs. The UE can detect/decode the PDCCH only in the corresponding DL CC set. That is, if the BS schedules the PDSCH/PUSCH to the UE, the BS can transmit the PDCCH only through the PDCCH monitoring DL CC. The PDCCH monitoring DL CC set may be configured UE-specifically, UE group-specifically, or cell-specifically. The term "PDCCH monitoring DL CC" may be replaced with equivalent terms such as monitoring carrier or monitoring cell. CC aggregated for the UE may be replaced with equivalent terms such as serving CC, serving carrier, or serving cell.

Figure 11:
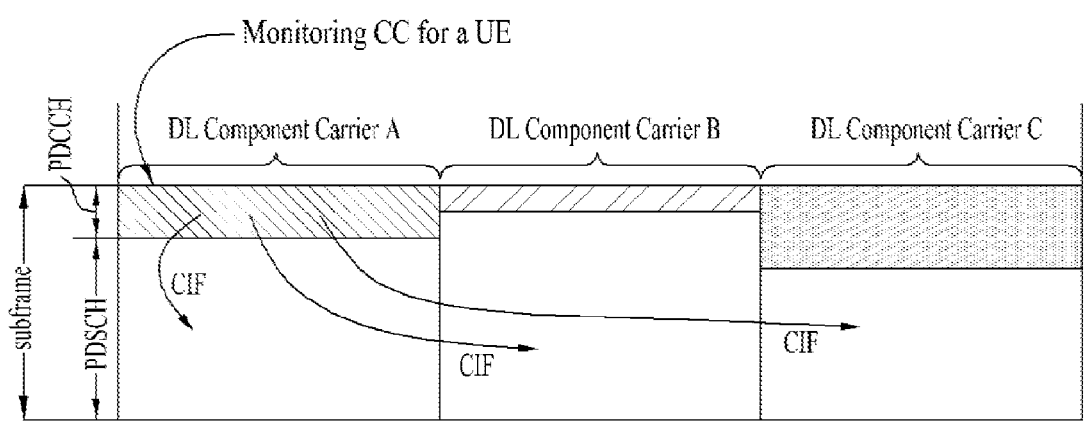
FIG. 11 illustrates cross-carrier scheduling.

FIG. 11 illustrates scheduling in the case where multiple carriers are aggregated. It is assumed that three DL CCs are aggregated and a DL CC A is configured as a PDCCH monitoring DL CC. DL CCs A, B, and C may be referred to as serving CCs, serving carriers, or serving cells. If a CIF is disabled, the DL CCs may transmit only PDCCHs for scheduling PDSCHs thereof without the CIF according to an LTE PDCCH rule. On the other hand, if the CIF is enabled by UE-specific (or UE group-specific or cell-specific) higher-layer signaling, the DL CC A (monitoring DL CC) may also transmit PDCCHs for scheduling PDSCHs of other CCs as well as a PDCCH for scheduling a PDSCH of the DL CC A, using the CIF. In this case, no PDCCH is transmitted in the DL CC B and DL CC C that are not configured as the PDCCH monitoring DL CC. In an LTE-A system, it is considered that multiple ACK/NACK information/signals for multiple PDSCHs transmitted through multiple DL CCs be transmitted through a specific UL CC. To this end, as opposed to ACK/NACK transmission using PUCCH format 1a/1b in legacy LTE, it is considered to joint-code multiple ACK/NACK information (e.g. using a Reed-Muller code, Tail-biting convolutional code, etc.) and then to transmit multiple ACK/NACK information/signals using PUCCH format 2 or new PUCCH format (referred to as Enhanced PUCCH (E-PUCCH)). The E-PUCCH format includes a block-spreading based PUCCH format. ACK/NACK transmission using PUCCH format 2/E-PUCCH format after joint coding is exemplary and PUCCH format 2/E-PUCCH format may be used without restrictions on UCI transmission. For example, PUCCH format 2/E-PUCCH format may be used to transmit ACK/NACK, CSI (e.g. CQI, PMI, RI, PTI, etc.), SR, or two or more pieces of information thereof together. Accordingly, in this specification, PUCCH format 2/E-PUCCH format may be used to transmit a joint coded UCI codeword irrespective of the type/number/size of UCI.

Figure 12:
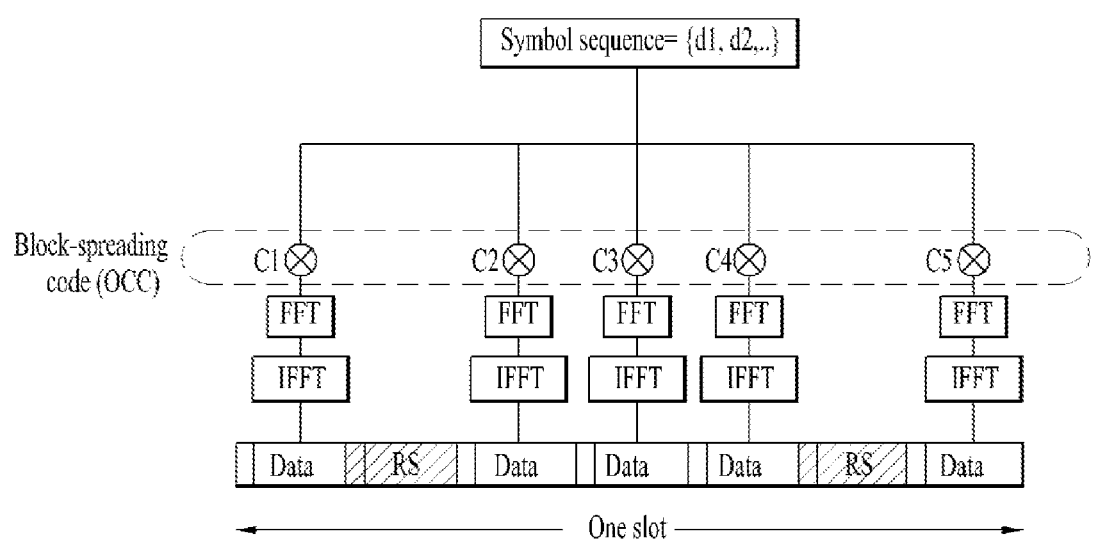
FIGS. 12 and 13 illustrate block-spreading based E-PUCCH formats.

FIG. 12 illustrates a block-spreading based E-PUCCH format in a slot level. In PUCCH format 2 of legacy LTE, one symbol sequence (d0~d4 in FIG. 6) is transmitted over the time domain and UE multiplexing is performed using CSs ($\alpha cs,x$, where x is 0 to 4) of Constant-Amplitude Zero Auto-Correlation (CAZAC) sequence (ru,O), as shown in FIG. 6. Meanwhile, in a block-spreading based E-PUCCH format, one symbol sequence is transmitted over the frequency domain and UE multiplexing is performed using Orthogonal Cover Code (OCC) based time-domain spreading. That is, the symbol sequence is spread in the time domain by the OCC and then transmitted. Control signals of multiple UEs can be multiplexed using the OCC.

Figure 13:
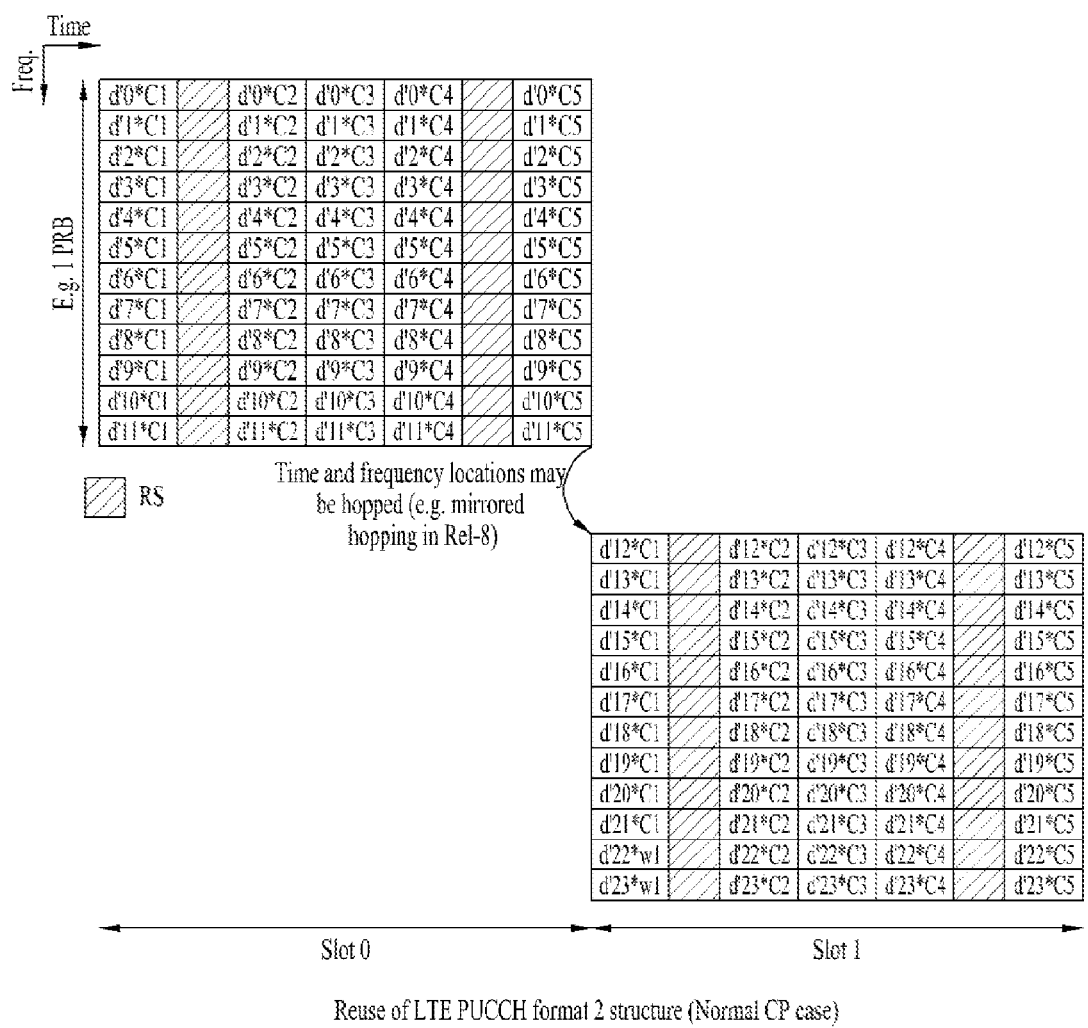

Referring to FIG. 12, a length-5 (Spreading Factor (SF)=5) OCC is used to generate 5 SC-FDMA symbols (i.e. UCI data parts) from one symbol sequence {d1, d2, . . . }. The symbol sequence {d1, d2, . . . } may mean a modulation symbol sequence or a codeword bit sequence. If the symbol sequence {d1, d2, . . . } means the bit sequence, the block diagram of FIG. 13 further includes a codeword modulation block. In FIG. 13, although a total of two RS symbols (i.e. RS parts) is used during one slot, various applications such as a scheme using UCI data parts configured using an OCC of SF=4 may be considered. Herein, the RS symbols may be generated from a CAZAC sequence having a specific CS. Moreover, the RS may be transmitted in a form in which a specific OCC is applied to (or multiplied by) multiple RS symbols of the time domain. Block-spread UCI is transmitted to a network through a Fast Fourier Transform (FFT) process and an Inverse Fast Fourier Transform (IFFT) process on an SC-FDMA symbol basis. Namely, the block-spreading scheme modulates control information (e.g. ACK/NACK etc.) using an SC-FDMA scheme unlike PUCCH format 1 or 2 series of legacy LTE.

FIG. 13 illustrates a block-spreading based E-PUCCH format in a slot level.

Referring to FIG. 13, a symbol sequence {d'0~d'11} in slot 0 is mapped to subcarriers of one SC-FDMA symbol and mapped to 5 SC-FDMA symbols by block-spreading using OCCs C1 to C5. Similarly, a symbol sequence {d'12~d'23} in slot 1 is mapped to subcarriers of one SC-FDMA symbol and is mapped to 5 SC-FDMA symbols by block-spreading using OCCs C1 to C5. Herein, the symbol sequence {d'0~d'11} or {d'12~d'23} in each slot shows a form in which FFT or FFT/IFFT is applied to the symbol sequence {d1, d2, . . . } of FIG. 13. If the symbol sequence {d'0~d'11} or {d'12~d'23} is a form in which FFT is applied to the symbol sequence {d1, d2, . . . } of FIG. 13, IFFT is additionally applied to the symbol sequence {d'0~d'11} or {d'12~d'23} to generate SC-FDMA symbols. The entire symbol sequence {d'0~d'23} is generated by joint coding one or more pieces of UCI. The front half {d'0~d'11} of the entire symbol sequence is transmitted through slot 0 and the rear half {d'12~d'23} of the entire symbol sequence is transmitted through slot 1. Although not shown, an OCC may vary on a slot basis and UCI data may be scrambled on an SC-FDMA symbol basis.

In the following description, a transmission scheme of channel coding based UCI (e.g. multiple ACK/NACK signals) using PUCCH format 2 or E-PUCCH format is referred to as a "multi-bit UCI coding" transmission scheme, for convenience of description. In the case of ACK/NACK for example, a multi-bit UCI coding transmission scheme indicates a method for joint-coding ACK/NACK information for PDSCHs (or PDCCHs in the Semi-Persistent Scheduling (SPS) release) of multiple DL cells or DTX information (representing that the PDCCHs are not received/detected) and transmitting the coded ACK/NACK block. For example, it is assumed that a UE operates in an SU-MIMO mode in a certain DL cell and receives two codewords. Then, a total of four feedback states of ACK/ACK, ACK/NACK, NACK/ACK, and NACK/NACK for a corresponding cell may be present or a maximum of 5 feedback states further including DTX may be present. If the UE receives a single codeword, a maximum of three states of ACK, NACK, and DTX may be present (if NACK and DTX are identically processed, a total of two states of ACK and NACK/DTX may be present). Accordingly, if the UE aggregates a maximum of 5 DL cells and operates in an SU-MIMO mode in all cells, a maximum of 55 transmittable feedback states is present. Hence, the size of a necessary ACK/NACK payload is at least 12 bits. If DTX and NACK are identically processed, the number of feedback states is 45 and the size of a necessary ACK/NACK payload is at least 10 bits.

Meanwhile, in the ACK/NACK multiplexing (i.e. ACK/NACK selection) (refer to Table 3) method applied to a legacy LTE TDD system, an implicit ACK/NACK selection scheme which uses a PUCCH resource corresponding to a PUCCH for scheduling each PDSCH of a corresponding UE (i.e. a PUCCH resource linked with the smallest CCE index) is basically used in order to secure a PUCCH resource of each UE. However, when the implicit scheme is applied using PUCCH resources in different RBs, performance degradation may occur. Accordingly, in an LTE-A system, an "explicit ACK/NACK selection" scheme using a PUCCH resource reserved for each UE (desirably, multiple PUCCH resources in the same RB or adjacent RBs) through RRC signaling etc. is additionally considered. Further, in the LTE-A system, ACK/NACK transmission through a single UE-specific UL cell (e.g. PCell) is considered.

Table 4 shows an example of explicitly indicating PUCCH resources for HARQ ACK.

TABLE 4

| HARQ-ACK resource value for PUCCH (ARI) | $n_{PUCCH}$ |
| --- | --- |
| 00 | 1st PUCCH resource value configured by higher layer |
| 01 | 2nd PUCCH resource value configured by higher layer |
| 10 | 3rd PUCCH resource value configured by higher layer |
| 11 | 4th PUCCH resource value configured by higher layer |

ARI indicates an ACK/NACK resource indicator. In Table 4, a higher layer includes an RRC layer and an ARI value may be indicated through a PDCCH which carries a DL grant. For example, the ARI value may be indicated through a Transmit Power Control (TPC) field of an Scell.

When a plurality of ACK/NACK signals for multiple cells is transmitted by applying the afore-mentioned multi-bit ACK/NACK coding and (explicit) ACK/NACK selection scheme, resources reserved explicitly for transmission of multiple ACK/NACK signals may be used even though the number of cells actually scheduled from a BS is one. Herein, "ACK/NACK or ACK/NACK state for a specific cell" or "ACK/NACK or ACK/NACK state of a specific cell" means ACK/NACK or ACK/NACK state for a PDSCH (or SPS release PDCCH) scheduled in a corresponding cell. ACK/NACK or ACK/NACK state includes ACK, NACK, DTX, or NACK/DTX.

For example, only one DL cell linked with a UL cell for ACK/NACK transmission (i.e. DL PCell) among a plurality of DL cells may be scheduled. In this case, in spite of the fact that a PUCCH resource (i.e. LTE PUCCH format 1a/1b) which is implicitly designated (i.e. linked with the smallest CCE index through which a PDCCH is transmitted) is available, a situation in which multi-bit ACK/NACK coding and explicit ACK/NACK selection should be applied only to ACK/NACK of a DL PCell by unnecessarily using an explicit resource may occur. More extensively, even when one or more cells including a DL PCell are simultaneously scheduled, the cases in which the other cells except for the DL PCell are all DTX (or NACK) may exist. Even in this case, an explicit-PUCCH resource is unnecessarily used.

To solve such problems, a PCell fallback method may be considered. According to the PCell fallback method, when one or multiple cells including a PCell are scheduled, if the other cells except for the PCell are all DTX (i.e. if only a PCell PDCCH (this means a PDCCH for scheduling a PDSCH transmitted through the PCell and may include an SPS release PDCCH) is detected or only a PCell SPS PDSCH (this means a PDSCH scheduled by an SPS scheme transmitted through the PCell) is received) (or NACK), ACK/NACK information may be transmitted using an implicit LTE PUCCH resource (e.g. LTE PUCCH format 1a/1b resource) linked with a PDCCH for scheduling the PCell rather than an explicit-PUCCH resource (if a PCell SPS PDSCH is received and the other cells are all DTX (or NACK), the implicit LTE PUCCH resource may be replaced with an LTE PUCCH format 1a/1b resource reserved for ACK/NACK feedback for an SPS PDSCH).

Meanwhile, when multi-bit ACK/NACK coding and (explicit) ACK/NACK selection schemes are applied, various schemes may be considered for SR transmission. As a representative example, an explicit-PUCCH SR scheme may be considered in which an additional explicit LTE-A PUCCH (e.g. E-PUCCH) resource is reserved for SR transmission, and ACK/NACK information is transmitted through an ACK/NACK LTE-A PUCCH resource in the case of a negative SR and through an SR LTE-A PUCCH resource in the case of a positive SR, in a similar way in legacy LTE. According to this method, the SR LTE-A PUCCH resource corresponding to the ACK/NACK LTE-A PUCCH resource is additionally used at least in an SR subframe. The SR subframe may be defined as a subframe in which SR information is transmitted or a subframe in which transmission of SR information is permitted, according to an implementation example. The SR subframe may be specified by higher-layer signaling (e.g. cycle or offset). Here, the ACK/NACK LTE-A PUCCH resource and the SR LTE-A PUCCH resource may be divided into different UCI data parts and/or different RS parts. The different UCI data parts refer to UCI data parts using at least one of different PRBs, different scrambling codes, and different OCCs. The different RS parts refer to UCI data parts using at least one of different PRBs, different CSs, and different OCCs.

As another example, a joint-coded SR scheme may be considered in which ACK/NACK information and SR information (e.g. 1-bit indicating a negative/positive SR, i.e. 0 for a negative SR and 1 for a positive SR) are joint-coded using an explicit LTE-A PUCCH resource for ACK/NACK transmission in an SR subframe and then transmitted. According to this method, when an ACK/NACK transmission event is present in the SR subframe, an E-PUCCH resource for SR is unnecessary.

Meanwhile, in the case where the PCell fallback method is applied together with the above-described methods, an explicit LTE PUCCH resource (e.g. LTE PUCCH format 1 resource) for SR transmission corresponding to an implicit LTE PUCCH resource (i.e. PUCCH format 1a/1b resource) for ACK/NACK transmission is additionally needed in preparation for PCell fallback in the SR subframe. In other words, if the PCell fallback method is applied in a situation in which the multi-bit ACK/NACK coding and (explicit) ACK/NACK selection schemes are applied, LTE-A PUCCH resource reservation for an explicit-PUCCH SR, ACK/NACK payload extension for a joint-coded SR, and LTE PUCCH resource reservation for SR during PCell fallback are needed. Namely, resources may be wasted because the LTE PUCCH resource as well as the E-PUCCH resource for an SR in the SR subframe should be reserved.

Figure 14:
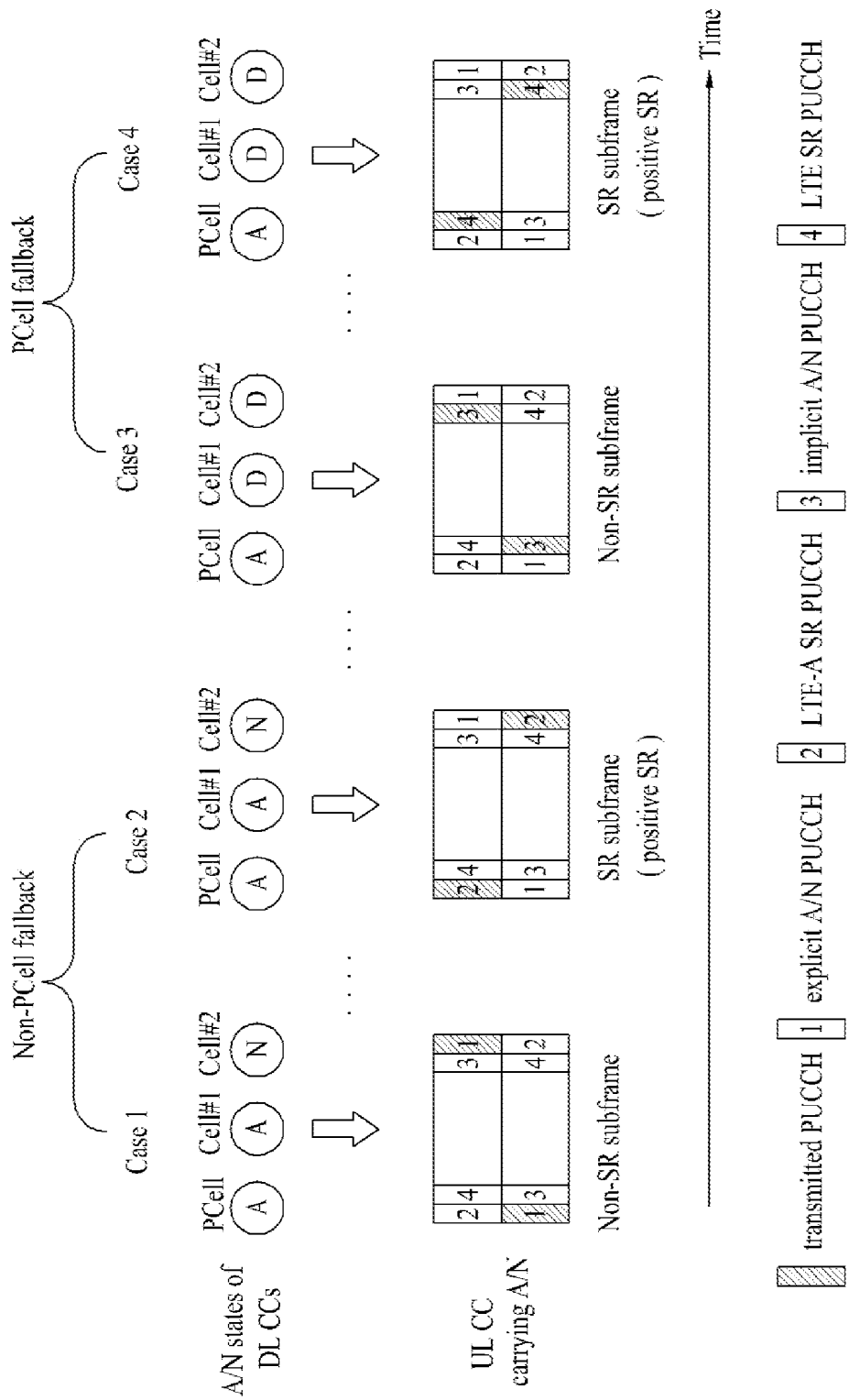
FIG. 14 illustrates SR transmission according to an explicit-PUCCH SR scheme.

FIG. 14 illustrates SR transmission according to a conventional explicit-PUCCH SR scheme. For convenience, 3 DL Cells are shown. Cell#1 and Cell#2 indicate SCells, 'A' indicates ACK, 'N' indicates NACK, and 'D' indicates DTX.

Referring to FIG. 14, Case 1 and Case 2 indicate non-PCell fallback states because ACK/NACK (A/N) states of the SCells are not all NACK or DTX. On the other hand, Case 3 and Case 4 indicate PCell fallback states because ACK/NACK states of the SCells are all NACK or DTX. The operation of a UE for each case is as follows.

Case 1: the UE transmits ACK/NACK information for a plurality of cells using a non-PCell fallback scheme in a non-SR subframe. The UE transmits a plurality of joint-coded ACK/NACK information using an explicitly indicated ACK/NACK LTE-A PUCCH (e.g. E-PUCCH) resource (e.g. resource of No. 1). The explicit resource for ACK/NACK transmission may be indicated using the ARI value shown in Table 4 and, in FIG. 14, the ARI may be provided using a TPC field in PDCCH DCI of Cell#1 and/or Cell#2. When a plurality of SCell PDCCHs is present, the same ARI value is provided in a plurality of SCells. Meanwhile, a TPC field of a PCell PDCCH is used to control the transmit power of a PUCCH for ACK/NACK transmission according to original use purpose thereof.

Case 2: the UE transmits ACK/NACK information for a plurality of cells using a non-PCell fallback scheme in an SR subframe. According to an explicit-PUCCH SR scheme, ACK/NACK information is transmitted through an explicit ACK/NACK LTE-A PUCCH (e.g. E-PUCCH) resource (e.g. resource of No. 1) in the case of a negative SR and through an SR LTE-A PUCCH resource (e.g. resource of No. 2) in the case of a positive SR. In FIG. 14, since the positive SR is assumed, the ACK/NACK information is transmitted through the explicitly indicated SR LTE-A PUCCH resource (e.g. resource of No. 2). The SR LTE-A PUCCH resource may be semi-statically reserved through higher-layer signaling (e.g. RRC signaling). Although not shown, according to a joint-coded SR scheme, the ACK/NACK information and a one-bit value indicating the negative/positive SR may be joint-coded together and then transmitted using the explicit ACK/NACK LTE-A PUCCH resource. Accordingly, in the joint-coded SR scheme, an ACK/NACK payload is extended by one bit for SR bit transmission.

Case 3: the UE transmits ACK/NACK information for a PDSCH (or SPS release PDCCH of a PCell) corresponding to a PCell PDCCH using a PCell fallback scheme in the non-SR subframe. According to the PCell fallback scheme, ACK/NACK information is transmitted using an implicit LTE PUCCH resource (e.g. LTE PUCCH format 1a/1b resource) (e.g. resource of No. 3) linked with the PCell PDCCH. The implicit LTE PUCCH resource is linked with the smallest CCE index for the PCell PDCCH (e.g. refer to Equation 1).

Case 4: the UE transmits ACK/NACK information for a PDSCH (or SPS release PDCCH of a PCell) corresponding to a PCell PDCCH using the PCell fallback scheme in the SR subframe. If the PCell fallback scheme is applied, ACK/NACK information is transmitted through an ACK/NACK LTE PUCCH resource (e.g. resource of No. 3) in the case of a negative SR and through an SR LTE PUCCH resource (e.g. resource of No. 4) in the case of a positive SR. In FIG. 14, since the positive SR is assumed, the ACK/NACK information is transmitted through the explicitly indicated SR LTE PUCCH resource (e.g. resource of No. 4). The SR LTE PUCCH resource may be semi-statically reserved through higher-layer signaling (e.g. RRC signaling).

In the above-described Case 2 and Case 4, it can be seen that the LTE-A PUCCH resource and LTE PUCCH resource for SR are explicitly given in the SR subframe. Thus, overhead for SR transmission increases and resources are wasted.

To solve the above problems, the present invention proposes that PCell fallback be permitted only in the non-SR subframe in order to reduce overhead caused by SR transmission during transmission of multiple ACK/NACK signals for multiple cells. That is, PCell fallback is not applied in the SR subframe. Although transmission of multiple ACK/NACK signals may be performed using multi-bit ACK/NACK coding and (explicit) ACK/NACK selection schemes, the present invention is not limited thereto. In this case, in the SR subframe, ACK/NACK and/or SR transmission can be performed only using the multi-bit ACK/NACK coding and explicit ACK/NACK selection schemes/resources irrespective of presence/absence of PCell scheduling and ACK/NACK information per cell.

According to this proposal, only SR resource reservation for applying the explicit-PUCCH SR method or ACK/NACK payload extension for applying the joint-coded SR method is needed for SR transmission. Namely, additional LTE PUCCH resource (i.e. resource used for SR transmission during PCell fallback in the SR subframe) reservation, described with reference to Case 4 of FIG. 14, may be omitted. Additionally, in the proposed method, since an implicit LTE PUCCH resource for PCell fallback is excluded from one or more PUCCH resources on which a BS should perform blind decoding in the SR subframe, blind decoding burden for PUCCH formats can be reduced.

Figure 15:
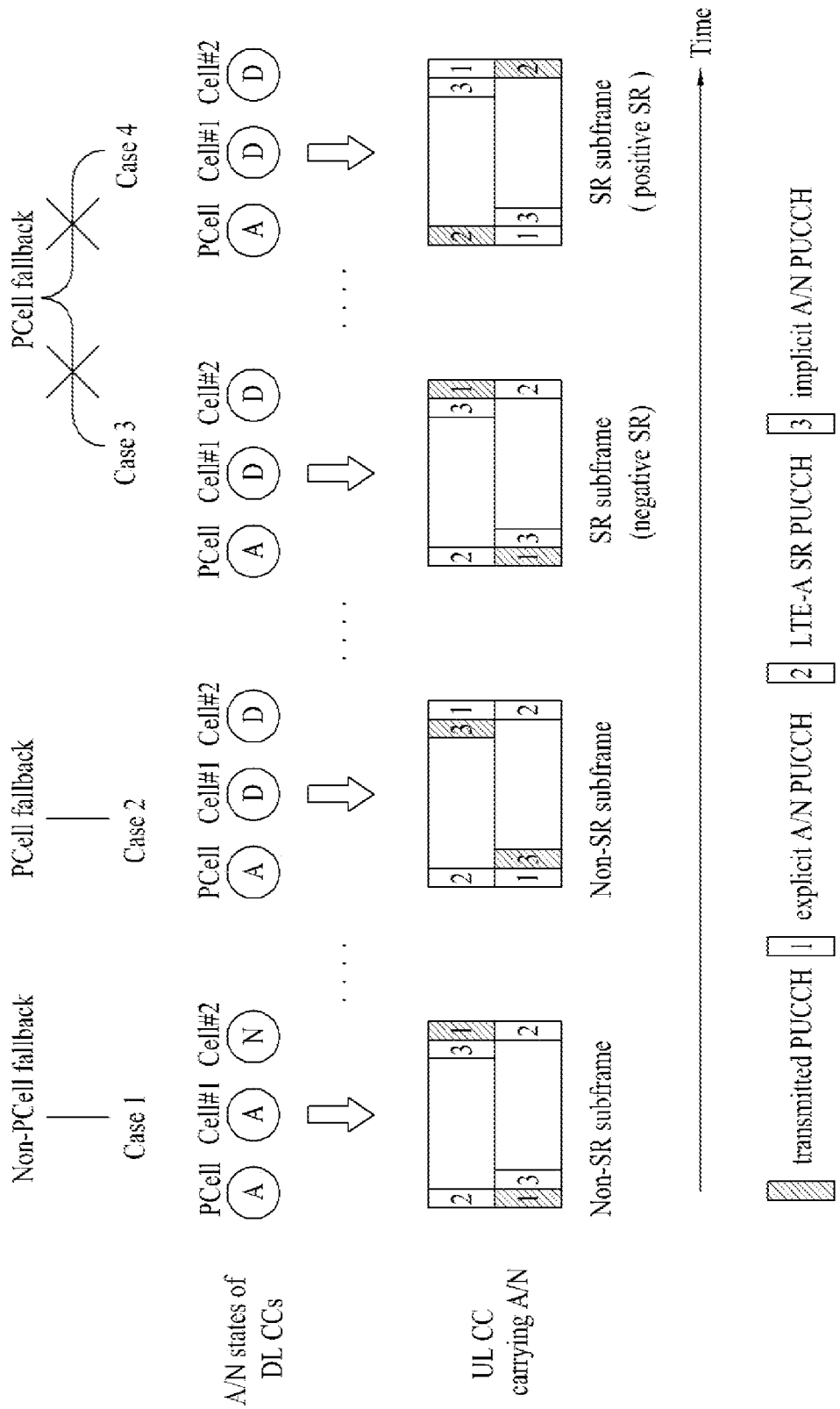
FIGS. 15 and 16 illustrate control information transmission according to an exemplary embodiment of the present invention.

FIG. 15 illustrates SR transmission using an explicit-PUCCH SR scheme according to an embodiment of the present invention. For convenience, 3 DL Cells are shown. Cell#1 and Cell#2 indicate SCells, and 'A', 'N', and 'D' indicate ACK, NACK, and DTX, respectively. Cases 1 and 2 are the same as Cases 1 and 3 of FIG. 14 described above.

Referring to FIG. 15, Cases 3 and 4 satisfy a PCell fallback condition because the ACK/NACK states of Scells are all NACK or DTX. However, since an ACK/NACK transmission event has occurred in an SR subframe, application of a PCell fallback scheme is limited according to the present invention. The present method shows the case in which application of the PCell fallback scheme is unconditionally limited when the ACK/NACK transmission event occurs in the SR subframe. Hence, ACK/NACK information is transmitted using an ACK/NACK LTE-A PUCCH (e.g. E-PUCCH) resource (e.g. resource of No. 1) in the case of a negative SR (Case 3) and using an SR LTE PUCCH resource (e.g. resource of No. 2) in the case of a positive SR (Case 4), according to an explicit-PUCCH SR scheme. Although not shown, according to a joint-coded SR scheme, the ACK/NACK information and a one-bit value indicating the negative/positive SR may be joint-coded together and then transmitted using the explicit ACK/NACK LTE-A PUCCH resource (e.g. resource of No. 1).

Meanwhile, an explicit resource for ACK/NACK transmission may be indicated using the ARI value shown in Table 4 and, in FIG. 15, the ARI may be given using a TPC field in PDCCH DCI of Cell#1 and/or Cell#2. On the other hand, a TPC field of a PCell PDCCH may be used to control the transmit power of a PUCCH for ACK/NACK transmission according to original use purpose thereof. In this case, the following problems may occur. For example, if only a PCell PDCCH (and a PDSCH corresponding thereto) is detected in a DL subframe k-n (e.g. n=4), the UE transmits ACK/NACK information corresponding to the PCell PDCCH in a UL subframe k. In this case, if the UL subframe k is an SR subframe, the UE should transmit ACK/NACK information using an explicitly indicated LTE-A PUCCH resource according to the present method. However, since the LTE-A PUCCH resource is signaled using a TPC field of an SCell PDCCH as described above, the UE cannot be aware of an explicit LTE-A PUCCH resource through which ACK/NACK information should be transmitted.

Accordingly, to solve the above problem, it is necessary to semi-statically pre-configure/pre-fix an explicit ACK/NACK LTE-A PUCCH resource to be used in the SR subframe. However, when the explicit ACK/NACK LTE-A PUCCH resource is previously fixed in the SR subframe, another problem may occur. For example, if an SCell PDCCH (and a PDCCH corresponding thereto) is detected in the DL subframe k-n, the UE transmits ACK/NACK information corresponding to the SCell PDCCH in the UL subframe k. At this time, the explicit LTE-A PUCCH resource for ACK/NACK transmission is indicated by the TPC field of the SCell PDCCH. Hence, if the UL subframe k is the SR subframe, two explicit ACK/NACK LTE-A PUCCH resources coexist. That is, the explicit ACK/NACK LTE-A PUCCH resource pre-configured/pre-fixed for the SR subframe and the explicit LTE-A PUCCH resource indicated by the TPC field of the SCell PDCCH coexist. Accordingly, there is a problem because UE does not know which resource of the two LTE-A PUCCH resources should be used to transmit ACK/NACK information.

To solve the above-mentioned problem, if a subframe (UL subframe k) in which the ACK/NACK transmission event occur is the SR subframe, it is proposed that the UE transmit ACK/NACK using the explicit ACK/NACK LTE-A PUCCH resource pre-configured/pre-fixed for the SR subframe. To this end, the TPC of the SCell PDCCH transmitted in the DL subframe k-n may have a scheduling restriction so as that an ARI value indicates the above-described pre-configured/pre-fixed explicit ACK/NACK LTE-A PUCCH resource. Namely, if the SCell PDCCH is detected in a DL subframe k-4 and a UL subframe k is the SR subframe, the UE may assume that the ARI value of the SCell PDCCH is identical to the ARI value indicating the pre-configured/pre-fixed explicit ACK/NACK LTE-A PUCCH resource.

In relation to this, if the ARI value of the SCell PDCCH is different from the ARI value indicating the pre-configured/pre-fixed explicit ACK/NACK LTE-A PUCCH resource, the UE may perform the following operations.

Option 1: the UE may disregard the ARI value of the SCell PDCCH.

Option 2: the UE may use the ARI value of the SCell PDCCH as CRC for PDCCH error check. Accordingly, if the ARI value of the SCell PDCCH is different from the ARI value indicating the pre-configured/pre-fixed explicit ACK/NACK LTE-A PUCCH resource, the UE judges that the SCell PDCCH has an error and may not perform decoding of a PDSCH indicated by the SCell PDCCH.

As another method, the UE does not interpret a value of the TPC field of the SCell PDCCH (of the SR subframe) as an ARI and may use the value to control the transmit power of the PUCCH according to an original use purpose.

As another example, the present invention additionally proposes that PCell fallback be permitted only in the case of a negative SR in the SR subframe (in addition to the non-SR subframe) in order to reduce SR transmission overhead, during transmission of multiple ACK/NACK signals for multiple cells. That is, PCell fallback is not applied in the case of a positive SR in the SR subframe. Transmission of multiple ACK/NACK signals is performed using, but not limited to, the multi-bit ACK/NACK coding and (explicit) ACK/NACK selection schemes. In this case, in the case of the positive SR in the SR subframe, ACK/NACK and/or SR transmission can be performed only using the multi-bit ACK/NACK coding and explicit ACK/NACK selection schemes/resources irrespective of presence/absence of PCell scheduling and ACK/NACK information per cell.

According to this proposal, only SR LTE-A PUCCH resource reservation for applying the explicit-PUCCH SR method or ACK/NACK payload extension for applying the joint-coded SR method is needed for SR (especially, positive SR) transmission. Accordingly, additional LTE PUCCH resource (i.e. resource used for SR (especially, positive SR) transmission during PCell fallback in the SR subframe) reservation may be omitted. Meanwhile, according to the present proposal, since PCell fallback is permitted in the case of the negative SR, additional blind decoding of a BS for an implicit PUCCH resource for PCell fallback in the SR subframe is needed. However, when power control per PUCCH format is considered, gain can be expected in that the implicit LTE PUCCH resource requiring relatively less power can be maximally used.

Figure 16:
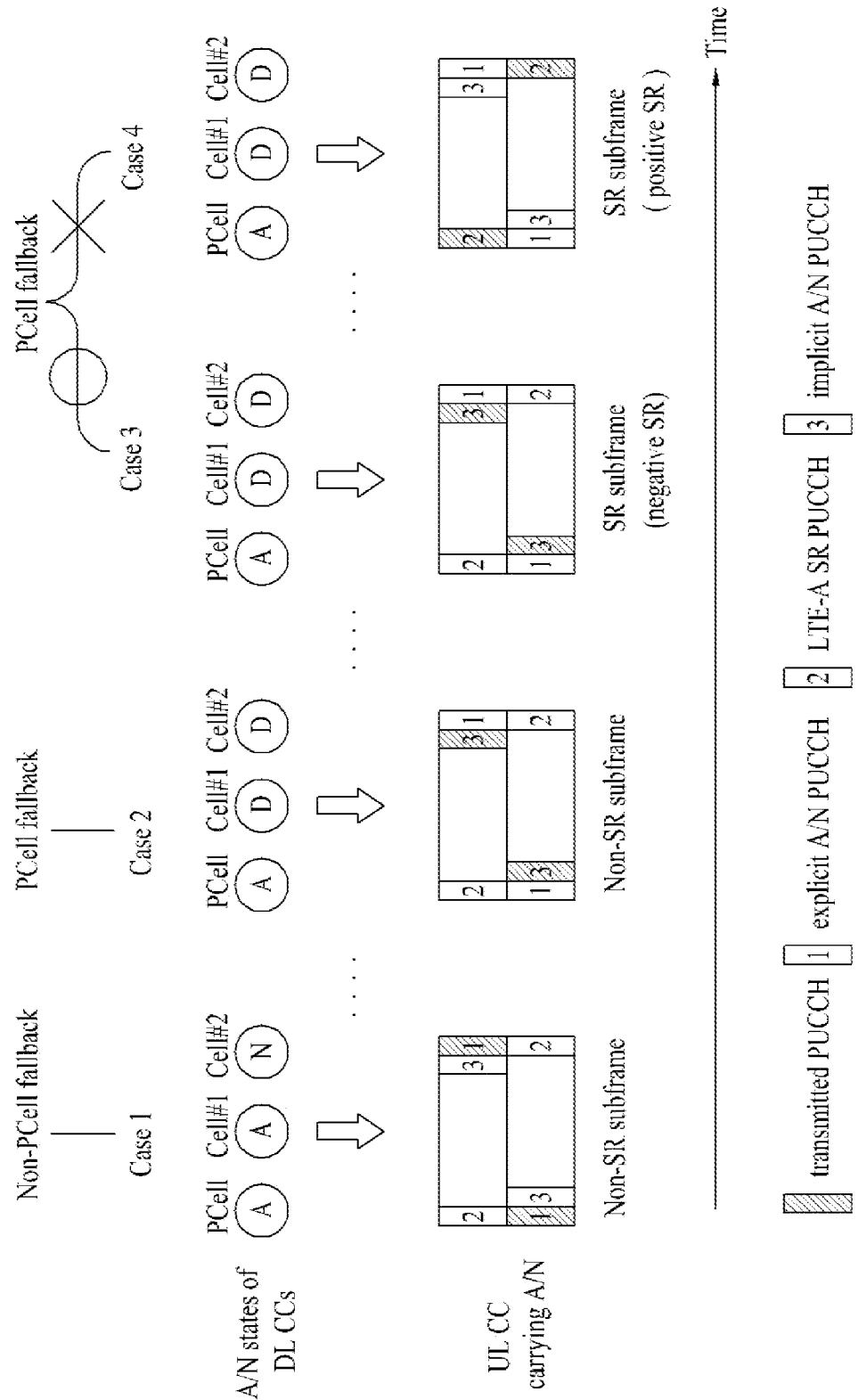

FIG. 16 illustrates SR transmission using an explicit-PUCCH SR scheme according to another embodiment of the present invention. For convenience, 3 DL Cells are shown. 'A', 'N', and 'D' indicate ACK, NACK, and DTX, respectively. Cell#1 and Cell#2 indicate SCells. Cases 1 and 2 are the same as Cases 1 and 3 of FIG. 14 described above.

Referring to FIG. 16, Cases 3 and 4 satisfy a PCell fallback condition because the ACK/NACK states of SCells are all NACK or DTX. However, since an ACK/NACK transmission event occurs in an SR subframe, application of the PCell fallback scheme is conditionally limited according to the present invention. Specifically, in the case of a positive SR in the SR subframe, application of the PCell fallback scheme is limited. Accordingly, in the case of a negative SR, ACK/NACK information is transmitted using an implicit ACK/NACK LTE PUCCH (e.g. PUCCH format 1a/1b) resource (e.g. resource of No. 3) according to the PCell fallback scheme. In the case of the positive SR (Case 3), the ACK/NACK information is transmitted using an SR LTE-A PUCCH resource (e.g. resource of No. 2) according to an explicit-PUCCH SR scheme (Case 4).

Figure 17:
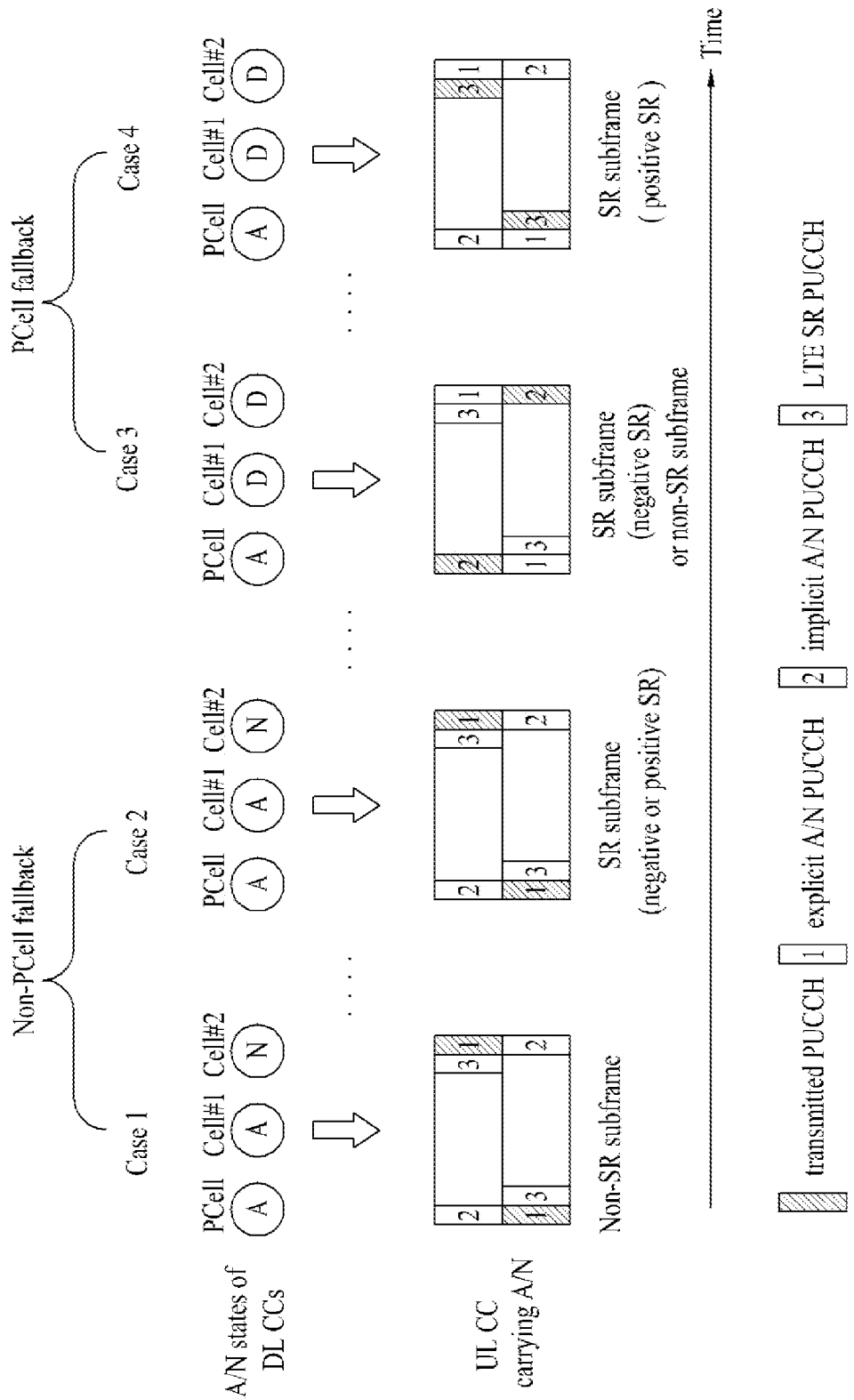
FIG. 17 illustrates SR transmission according to a conventional joint-coded SR scheme.

FIG. 17 illustrates SR transmission according to a conventional joint-coded SR scheme. For convenience, 3 DL Cells are shown. Cell#1 and Cell#2 indicate SCells and 'A' 'N', and 'D' indicates ACK, NACK, and DTX, respectively.

Referring to FIG. 17, Case 1 and Case 2 indicate non-PCell fallback states because ACK/NACK states of the SCells are not all NACK or DTX. On the other hand, Case 3 and Case 4 indicate PCell fallback states because ACK/ NACK states of the SCells are all NACK or DTX. The operation of a UE for each case is as follows.

Case 1: the UE transmits ACK/NACK information for a plurality of cells using a non-PCell fallback scheme in a non-SR subframe. The UE transmits a plurality of joint-coded ACK/NACK information using an explicitly indicated ACK/NACK LTE-A PUCCH (e.g. E-PUCCH) resource (e.g. resource of No. 1). The explicit resource for ACK/NACK transmission may be indicated using the ARI value shown in Table 4 and, in FIG. 17, the ARI may be provided using a TPC field in PDCCH DCI of Cell#1 and/or Cell#2. When a plurality of SCell PDCCHs is present, the same ARI value is provided in a plurality of SCells. Meanwhile, a TPC field of a PCell PDCCH is used to control the transmit power of a PUCCH for ACK/NACK transmission according to original use purpose thereof.

Case 2: the UE transmits ACK/NACK information for a plurality of cells using a non-PCell fallback scheme in an SR subframe. According to the joint-coded SR scheme, ACK/ NACK information and a one-bit value (SR indication information) indicating a negative/positive SR may be joint-coded together and then transmitted using the explicit ACK/ NACK LTE-A PUCCH resource (e.g. resource of No. 1). Specifically, the SR indication information may be set to 1 for the positive SR and may be set to 0 for the negative SR. The SR indication information may be added to the front/ end of the ACK/NACK information and may be joint-coded with the ACK/NACK information. Accordingly, the ACK/ NACK information and SR indication information are transmitted through the explicit ACK/NACK LTE-A PUCCH resource (e.g. resource of No. 1) irrespective of whether the SR subframe is a positive or negative SR. Therefore, an SR LTE-A PUCCH resource is not needed in the SR subframe.

Case 3: the UE transmits ACK/NACK information for a PDSCH (or SPS release PDCCH of a PCell) corresponding to a PCell PDCCH using a PCell fallback scheme in an SR subframe (negative SR) or a non-SR subframe. According to the PCell fallback scheme, ACK/NACK information is transmitted using an implicit LTE PUCCH resource (e.g. LTE PUCCH format 1a/1b resource) (e.g. resource of No. 2) linked with the PCell PDCCH. The implicit LTE PUCCH resource is linked with the smallest CCE index for the PCell PDCCH (e.g. refer to Equation 1).

Case 4: the UE transmits ACK/NACK information for a PDSCH (or SPS release PDCCH of a PCell) corresponding to a PCell PDCCH using the PCell fallback scheme in the SR subframe (positive SR). If the PCell fallback scheme is applied, ACK/NACK information is transmitted through an ACK/NACK LTE PUCCH resource (e.g. resource of No. 2) in the case of a negative SR and through an SR LTE PUCCH resource (e.g. resource of No. 3) in the case of a positive SR. In FIG. 17, since the positive SR is assumed, the ACK/ NACK information is transmitted through the explicitly indicated SR LTE PUCCH resource (e.g. resource of No. 3). The SR LTE PUCCH resource may be semi-statically reserved through higher-layer signaling (e.g. RRC signaling).

In the above-described Case 3 and Case 4, it can be seen that the implicit LTE PUCCH resource for ACK/NACK and the LTE PUCCH resource for SR are given in the SR subframe in preparation for PCell fallback. Thus, overhead required for ACK/NACK and SR transmission increases and resources are wasted.

Figure 18:
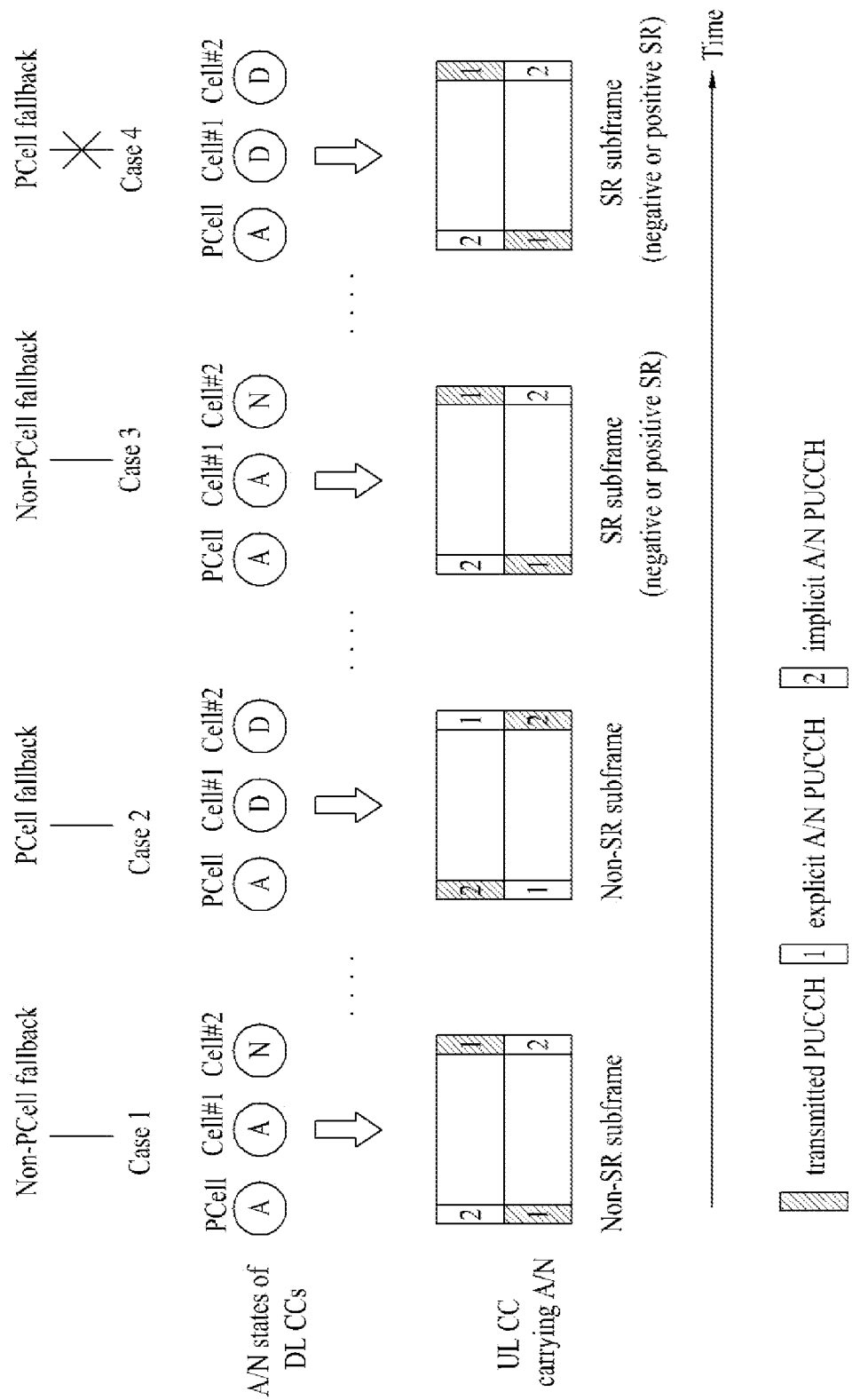
FIG. 18 illustrates control information transmission according to another exemplary embodiment of the present invention.

FIG. 18 illustrates SR transmission using a joint-coded SR scheme according to an embodiment of the present invention. For convenience, 3 DL Cells are shown. Cell#1 and Cell#2 indicate SCells and 'A', 'N', and 'D' indicate ACK, NACK, and DTX, respectively. Cases 1, 2, and 3 are the same as Cases 1, 3, and 2 of FIG. 17 described above.

Referring to FIG. 18, Case 4 satisfies a PCell fallback condition because the ACK/NACK states of SCells are all NACK or DTX. However, since an ACK/NACK transmission event occurs in an SR subframe, application of the PCell fallback scheme is limited according to the present invention. The present method shows the case in which application of the PCell fallback scheme is unconditionally limited when the ACK/NACK transmission event occurs in the SR subframe. Namely, in the SR subframe, ACK/NACK and SR are unconditionally joint-coded according to the joint-coded SR scheme irrespective of whether PCell fallback is applied and irrespective of a positive/negative SR and then are transmitted using a pre-configured ACK/NACK PUCCH resource. Specifically, ACK/NACK information and a one-bit value (SR indication information) indicating the negative/positive SR may be joint-coded together and then transmitted using the explicit ACK/NACK LTE-A PUCCH resource (e.g. resource of No. 1) in the SR subframe. Therefore, as opposed to a conventional method, resources can be efficiently used because it is not necessary to reserve an LTE PUCCH resource for SR in the SR subframe in preparation for PCell fallback.

Figure 19:
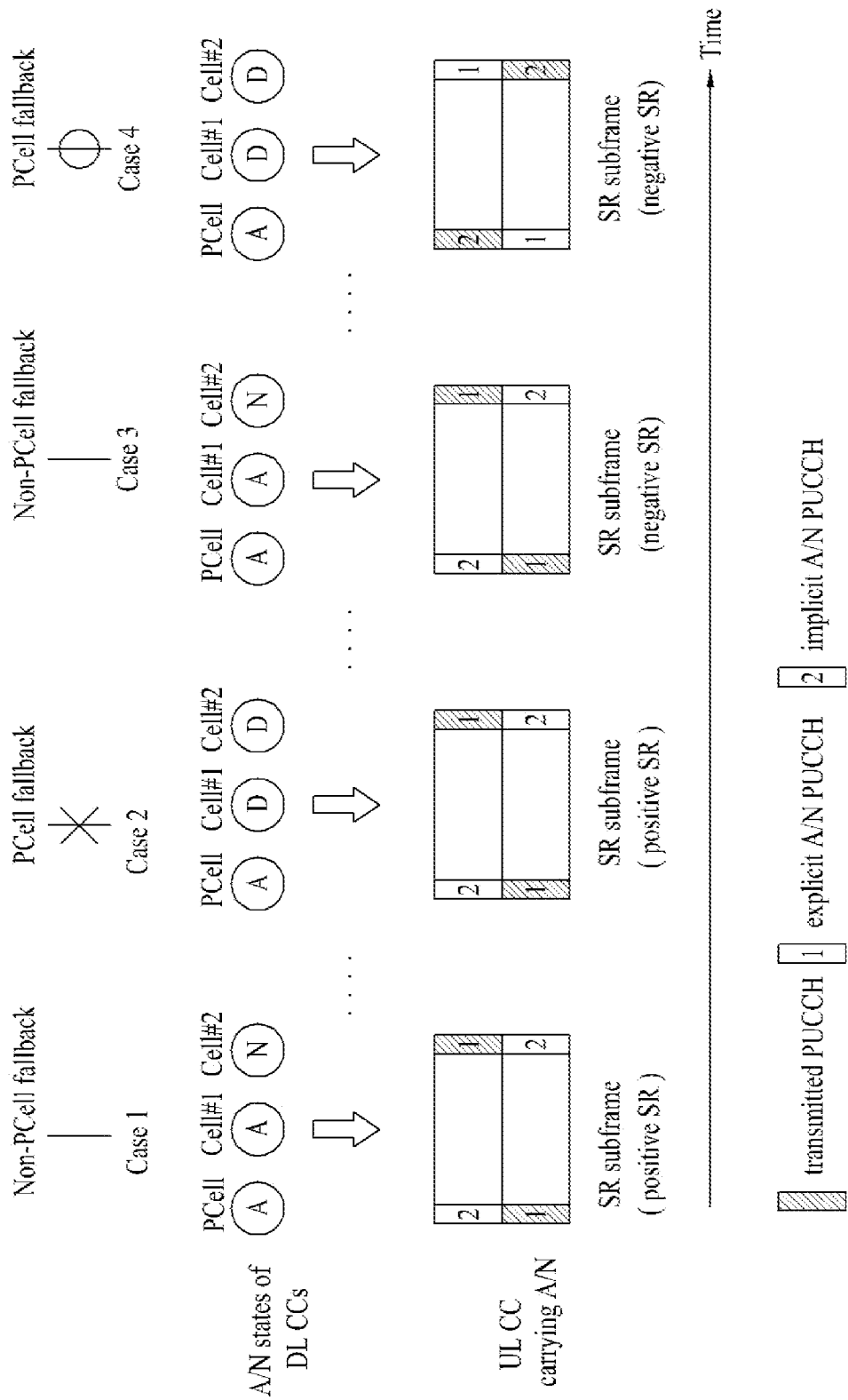
FIG. 19 illustrates control information transmission according to another exemplary embodiment of the present invention.

FIG. 19 illustrates SR transmission using a joint-coded SR scheme according to another embodiment of the present invention. For convenience, 3 DL Cells are shown. 'A', 'N', and 'D' indicate ACK, NACK, and DTX, respectively. Cell#1 and Cell#2 indicate SCells. Cases 1 and 3 are the same as Cases 1 and 2 of FIG. 17 described above.

Referring to FIG. 19, Cases 2 and 4 satisfy a PCell fallback condition because the ACK/NACK states of SCells are all NACK or DTX. However, since an ACK/NACK transmission event has occurred in an SR subframe, application of the PCell fallback scheme is conditionally limited according to the present invention. Specifically, application of the PCell fallback scheme is limited in the case of a positive SR in the SR subframe. In summary, in the case of the positive SR in the SR subframe, ACK/NACK and SR are unconditionally joint-coded irrespective of whether PCell fallback is applied and are transmitted using a pre-configured ACK/NACK PUCCH resource. In the case of a negative SR in the SR subframe and in a non-PCell fallback situation, ACK/NACK and SR are unconditionally joint-coded and transmitted using the pre-configured ACK/NACK PUCCH resource. On the other hand, in the case of the negative SR in the SR subframe and in a PCell fallback situation, ACK/NACK is transmitted using an implicitly indicated PUCCH resource. Specifically, in the case of the negative SR in the SR subframe, ACK/NACK information is transmitted using an implicit ACK/NACK LTE PUCCH (e.g. PUCCH format 1a/1b) resource (e.g. resource of No. 2) according to the PCell fallback scheme (Case 4). In the case of the positive SR, ACK/NACK information and one-bit SR indication information are joint-coded together and then are transmitted using the ACK/NACK LTE-A PUCCH resource (e.g. resource of No. 1) according to the joint-coded SR scheme (Case 2). Referring to FIGS. 18 and 19, if a PCell fallback condition is satisfied (e.g. if only a PCell PDCCH (and a PDSCH corresponding thereto) is detected in a DL subframe k-n (e.g. n=4)), it is necessary to semi-statically pre-configure/pre-fix the explicit ACK/NACK LTE-A PUCCH resource to be used in the SR subframe (e.g. UL subframe k) as described above. In this case, the explicit ACK/NACK LTE-A PUCCH resource pre-indicated for the SR subframe and the explicit LTE-A PUCCH resource indicated by a TPC field of an SCell PDCCH may coexist.

Even in this case, if a subframe (UL subframe k) in which the ACK/NACK transmission event occurs is the SR subframe, it is proposed that the UE transmit ACK/NACK using the explicit ACK/NACK LTE-A PUCCH resource pre-configured/pre-fixed for the SR subframe in a similar way to the above description. To this end, the TPC of the SCell PDCCH transmitted in the DL subframe k-n may have a scheduling restriction so as that an ARI value indicates the above-described pre-fixed explicit ACK/NACK LTE-A PUCCH resource. Namely, if the SCell PDCCH is detected in a DL subframe k-4 and a UL subframe k is the SR subframe, the UE may assume that the ARI value of the SCell PDCCH is identical to the ARI value indicating the pre-fixed explicit ACK/NACK LTE-A PUCCH resource.

In relation to this, if the ARI value of the SCell PDCCH is different from the ARI value indicating the pre-fixed explicit ACK/NACK LTE-A PUCCH resource, the UE may perform the following operations.

Option 1: the UE may disregard the ARI value of the SCell PDCCH.

Option 2: the UE may use the ARI value of the SCell PDCCH as CRC for PDCCH error check. Accordingly, if the ARI value of the SCell PDCCH is different from the ARI value indicating the pre-fixed explicit ACK/NACK LTE-A PUCCH resource, the UE judges that the SCell PDCCH has an error and may not perform decoding of a PDSCH indicated by the SCell PDCCH.

As another method, the UE does not interpret a value of the TPC field of the SCell PDCCH (of the SR subframe) as an ARI and may use the value to control the transmit power of the PUCCH according to an original use purpose.

Figure 20:
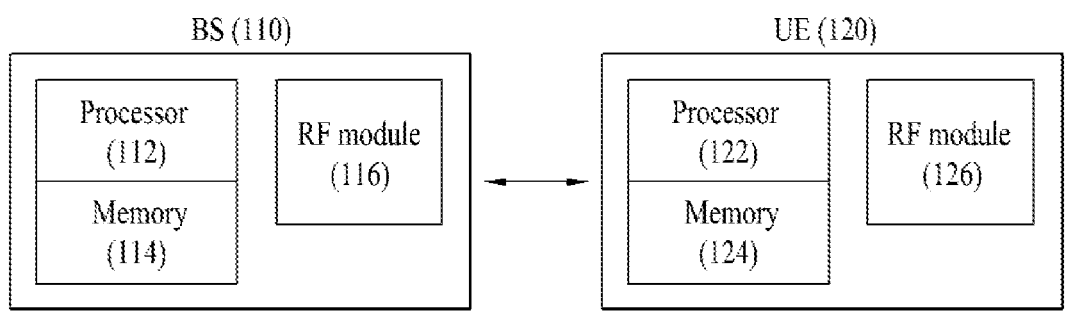
FIG. 20 illustrates a BS and a UE which are applicable to an exemplary embodiment of the present invention.

FIG. 20 illustrates a BS and a UE which are applicable to an embodiment of the present invention. If a wireless communication system includes a relay, communication over a backhaul link is performed between the BS and the relay and communication over an access link is performed between the relay and the UE. Accordingly, the BS and UE shown in FIG. 20 may be replaced with the relay according to circumstance.

Referring to FIG. 20, a wireless communication system includes a BS 110 and a UE 120. The BS 110 includes a processor 112, a memory 114, and a Radio Frequency (RF) unit 116. The processor 112 may be configured to implement the procedures and/or methods proposed in the present invention. The memory 114 is connected to the processor 112 and stores information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed in the present invention. The memory 124 is connected to the processor 122 and stores information related to operation of the processor 122. The RF unit 126 is connected to the processor 122 and transmits and/or receives radio signals. The BS 110 and/or the UE 120 may have a single antenna or multiple antennas.

The above-described embodiments are combinations of constituent elements and features of the present invention in a predetermined form. The constituent elements or features should be considered selectively unless otherwise mentioned. Each constituent element or feature may be practiced without being combined with other constituent elements or features. Further, the embodiments of the present invention may be constructed by combining partial constituent elements and/or partial features. Operation orders described in the embodiments of the present invention may be rearranged. Some constructions or features of any one embodiment may be included in another embodiment or may be replaced with corresponding constructions or features of another embodiment. It is apparent that the embodiments may be constructed by a combination of claims which do not have an explicitly cited relationship in the appended claims or may include new claims by amendment after application.

In the present document, a description has been made of a data transmission and reception relationship between a UE and a BS. Here, a specific operation described as being performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the term fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be used for a wireless communication device such as a UE, a relay, and a BS.

What is claimed is:

1. A method for transmitting uplink control information by a communication apparatus configured with a plurality of cells including a Primary Cell (PCell) and a Secondary Cell (SCell) in a wireless communication system, the method comprising:
   receiving, by the communication apparatus, at least one Physical Downlink Shared Channel (PDSCH) on the plurality of cells in a first subframe; and
   transmitting, by the communication apparatus, Hybrid Automatic Repeat Request Acknowledgement (HARQ-ACK) information about the PDSCH through a Physical Uplink Control Channel (PUCCH) in a second subframe configured for Scheduling Request (SR) transmission,
   wherein for a positive SR in the second subframe, and only if one PDSCH is detected on the PCell among the plurality of cells in the first subframe, the HARQ-ACK information is transmitted using a SR PUCCH resource,
   wherein for a negative SR in the second subframe, and only if one PDSCH is detected on the PCell among the plurality of cells in the first subframe, the HARQ-ACK information is transmitted using a HARQ-ACK PUCCH resource different from the SR PUCCH resource, the HARQ-ACK PUCCH resource being determined by using an index of a resource constituting a Physical Downlink Control Channel (PDCCH) corresponding to the one PDSCH detected on the PCell among the plurality of cells in the first subframe, and
   wherein if at least one PDSCH is detected on the SCell among the plurality of cells in the first subframe, the HARQ-ACK information and one-bit information indicating either a positive SR or a negative SR are transmitted using another HARQ-ACK PUCCH resource configured by a first Radio Resource Control (RRC) signaling.

2. The method of claim 1, wherein the SR PUCCH resource is configured by a second RRC signaling.

3. The method of claim 1, wherein the index of the resource constituting the PDCCH is a lowest index of Control Channel Elements (CCEs) constituting the PDCCH.

4. The method of claim 1, wherein the PDCCH corresponding to the one PDSCH detected on the PCell is received on the PCell.

5. The method of claim 1, wherein the first subframe is subframe #n and the second subframe is subframe #n+4.

6. The method of claim 1, wherein the second subframe is in a set of periodically assigned subframes for SR transmission.

7. A communication apparatus for use in a wireless communication system, the communication apparatus comprising:
   a Radio Frequency (RF) unit; and
   a processor,
   wherein the processor is configured to:
   configure a plurality of cells including a Primary Cell (PCell) and a Secondary Cell (SCell),
   receive at least one Physical Downlink Shared Channel (PDSCH) on the plurality of cells in a first subframe, and
   transmit Hybrid Automatic Repeat Request Acknowledgement (HARQ-ACK) information about the PDSCH through a Physical Uplink Control Channel (PUCCH) in a second subframe configured for Scheduling Request (SR) transmission,
   wherein for a positive SR in the second subframe, only if one PDSCH is detected on the PCell among the plurality of cells in the first subframe, the HARQ-ACK information is transmitted using a SR PUCCH resource,
   wherein for a negative SR in the second subframe, only if one PDSCH is detected on the PCell among the plurality of cells in the first subframe, the HARQ-ACK information is transmitted using a HARQ-ACK PUCCH resource different from the SR PUCCH resource, the HARQ-ACK PUCCH resource being determined by using an index of a resource constituting a Physical Downlink Control Channel (PDCCH) corresponding to the one PDSCH detected on the PCell among the plurality of cells in the first subframe, and
   wherein if at least one PDSCH is detected on the SCell among the plurality of cells in the first subframe, the HARQ-ACK information and one-bit information indicating either a positive SR or a negative SR are transmitted using another HARQ-ACK PUCCH resource configured by a first Radio Resource Control (RRC) signaling.

8. The communication apparatus of claim 7, wherein the SR PUCCH resource is configured by a second RRC signaling.

9. The communication apparatus of claim 7, wherein the index of the resource constituting the PDCCH is a lowest index of Control Channel Elements (CCEs) constituting the PDCCH.

10. The communication apparatus of claim 7, wherein the PDCCH corresponding to the one PDSCH detected on the PCell is received on the PCell.

11. The communication apparatus of claim 7, wherein the first subframe is subframe #n and the second subframe is subframe #n+4.

12. The communication apparatus of claim 7, wherein the second subframe is in a set of periodically assigned subframes for SR transmission.

\* \* \* \* \*